United States Patent
Azekatsu

(10) Patent No.: US 8,302,746 B2
(45) Date of Patent: Nov. 6, 2012

(54) HYDRAULIC SHOCK ABSORBER

(75) Inventor: Yoshitomo Azekatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 12/582,833

(22) Filed: Oct. 21, 2009

(65) Prior Publication Data

US 2010/0096229 A1   Apr. 22, 2010

(30) Foreign Application Priority Data

| | | |
|---|---|---|
| Oct. 21, 2008 | (JP) | 2008-270649 |
| Nov. 28, 2008 | (JP) | 2008-305318 |
| Dec. 1, 2008 | (JP) | 2008-306301 |
| Jan. 16, 2009 | (JP) | 2009-007495 |
| Feb. 9, 2009 | (JP) | 2009-027014 |

(51) Int. Cl.
*F16F 9/34* (2006.01)

(52) U.S. Cl. .................. 188/322.15; 188/281

(58) Field of Classification Search ............. 188/322.15, 188/322.22, 280, 281, 282.1, 282.5, 282.6, 188/282.9, 316, 317; 267/124, 127
See application file for complete search history.

(56) References Cited

U.S. PATENT DOCUMENTS

| | | | |
|---|---|---|---|
| 2,327,295 | A | 8/1943 | Whisler, Jr. |
| 3,896,908 | A | 7/1975 | Petrak |
| 4,867,286 | A | 9/1989 | Taylor |
| 6,352,145 | B1 | 3/2002 | DeMolina et al. |
| 7,201,260 | B2 | 4/2007 | Diederich et al. |
| 2002/0027051 | A1 | 3/2002 | Grundei |
| 2004/0245058 | A1 * | 12/2004 | Diederich et al. ....... 188/322.15 |
| 2007/0007091 | A1 | 1/2007 | Brehler et al. |

FOREIGN PATENT DOCUMENTS

| | | |
|---|---|---|
| DE | 946 758 C | 8/1956 |
| EP | 1 484 526 A1 | 12/2004 |
| JP | 9-291961 | 11/1997 |
| JP | 2000-110881 A | 4/2000 |

* cited by examiner

*Primary Examiner* — Pamela Rodriguez

(74) *Attorney, Agent, or Firm* — Carrier Blackman & Associates, P.C.; Joseph P. Carrier; William D. Blackman

(57) ABSTRACT

A hydraulic shock absorber which includes a piston which is slidably fitted into a cylinder and partitions the cylinder into first and second fluid chambers; and a piston rod which is connected to the piston and slidably penetrates through an end wall of the cylinder, wherein the piston rod penetrates through the piston and includes on the outer circumferential surface of the piston rod at least one groove which communicates between the first and second fluid chambers, and the first and second fluid chambers are communicated with each other through the at least one groove.

17 Claims, 20 Drawing Sheets

FIG.3A  High damping force, Low acceleration
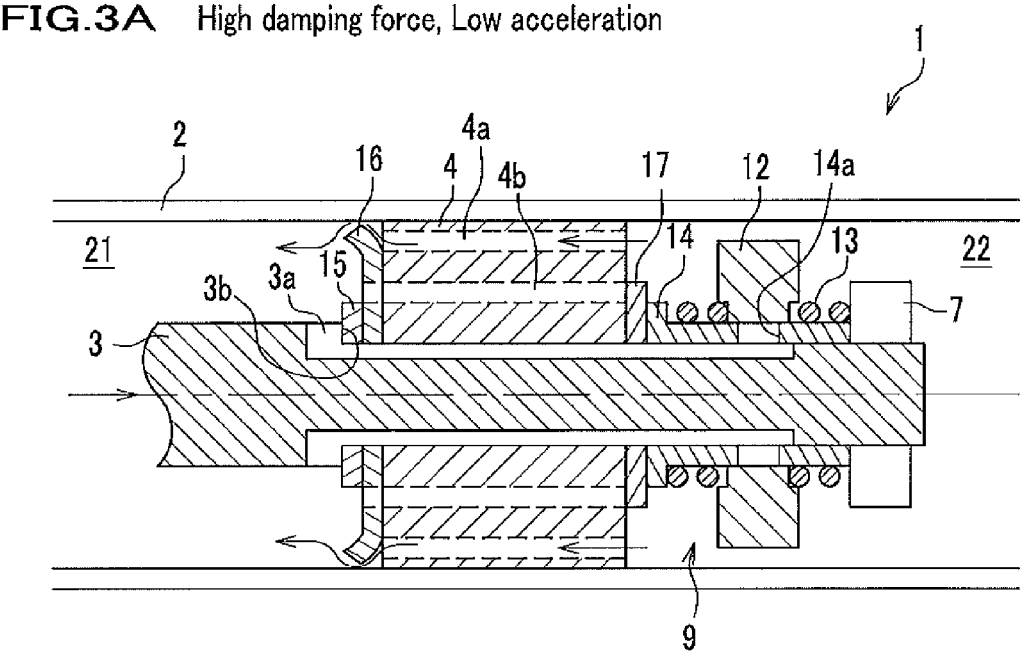
FIG.3B
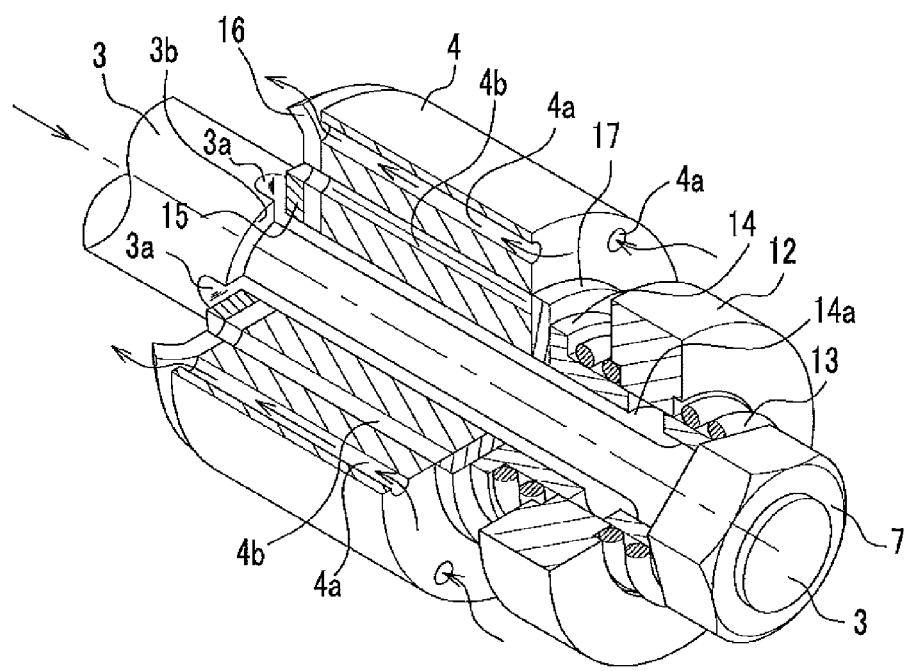

FIG.4A  Low damping force, High acceleration
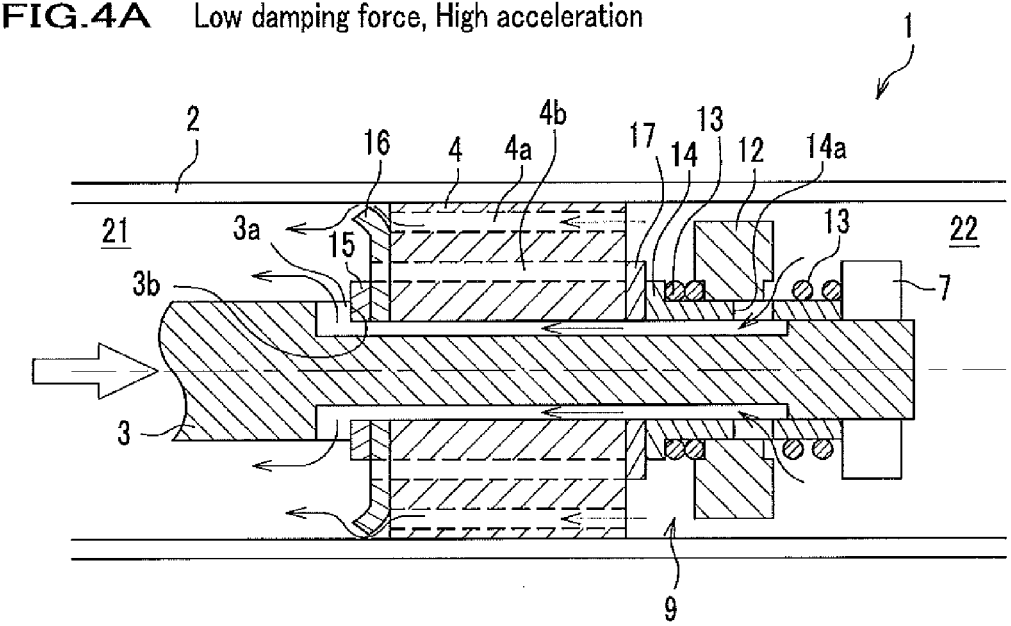
FIG.4B
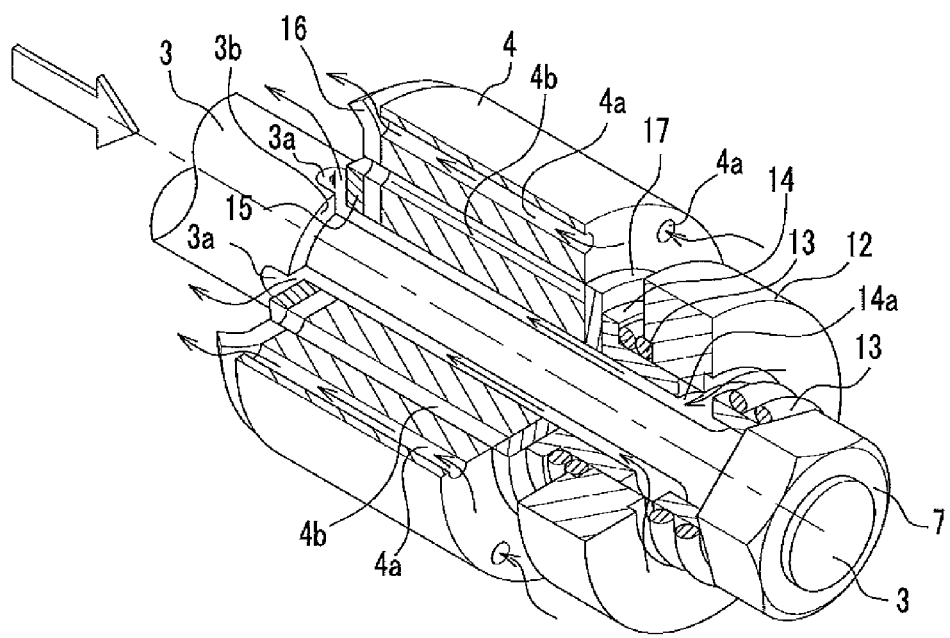

FIG.5A    Low damping force, Low acceleration
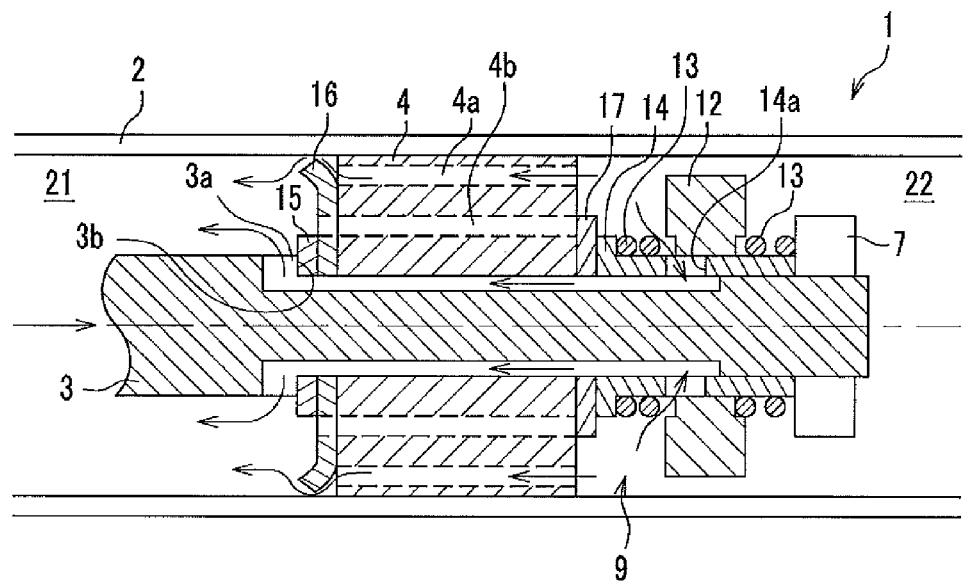
FIG.5B    High damping force, High acceleration
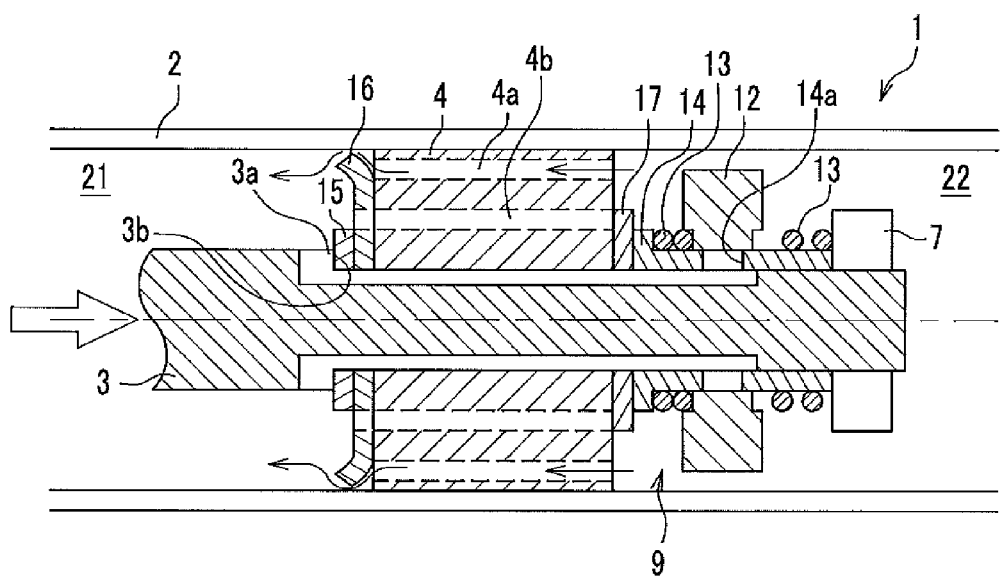

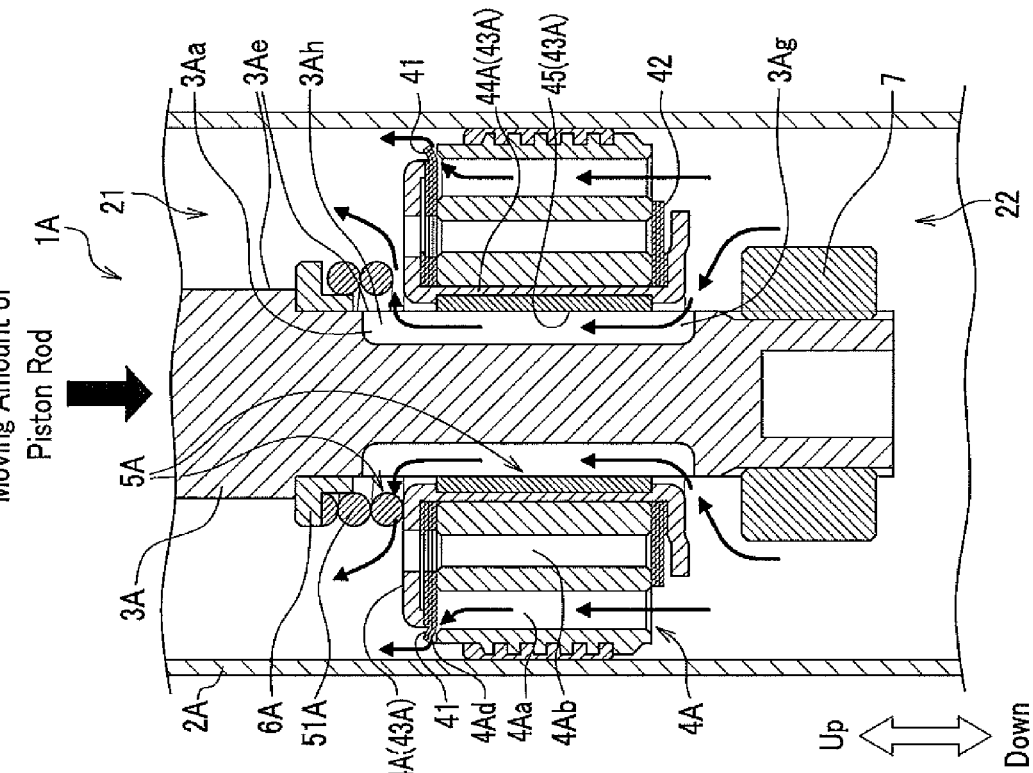
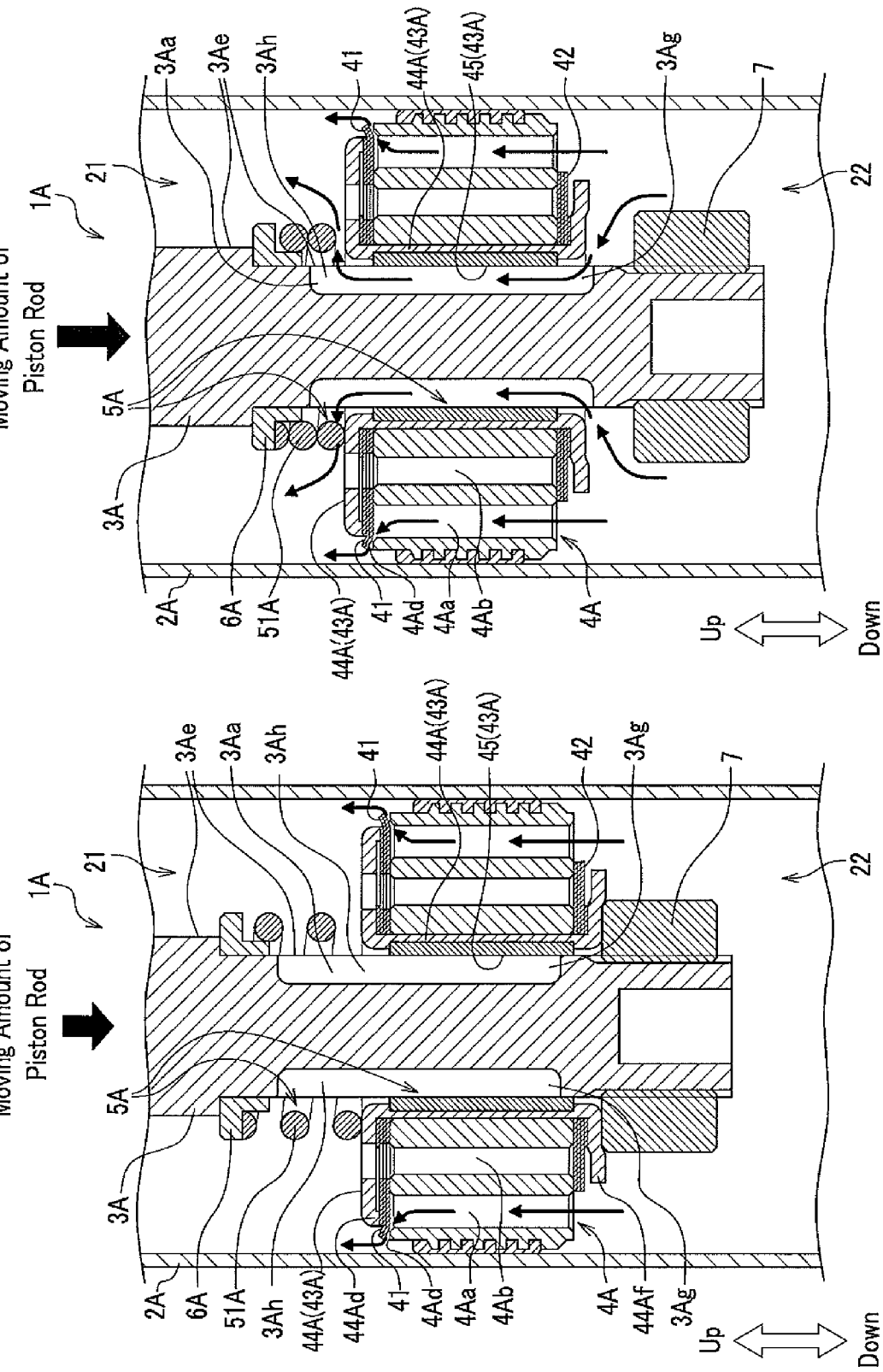

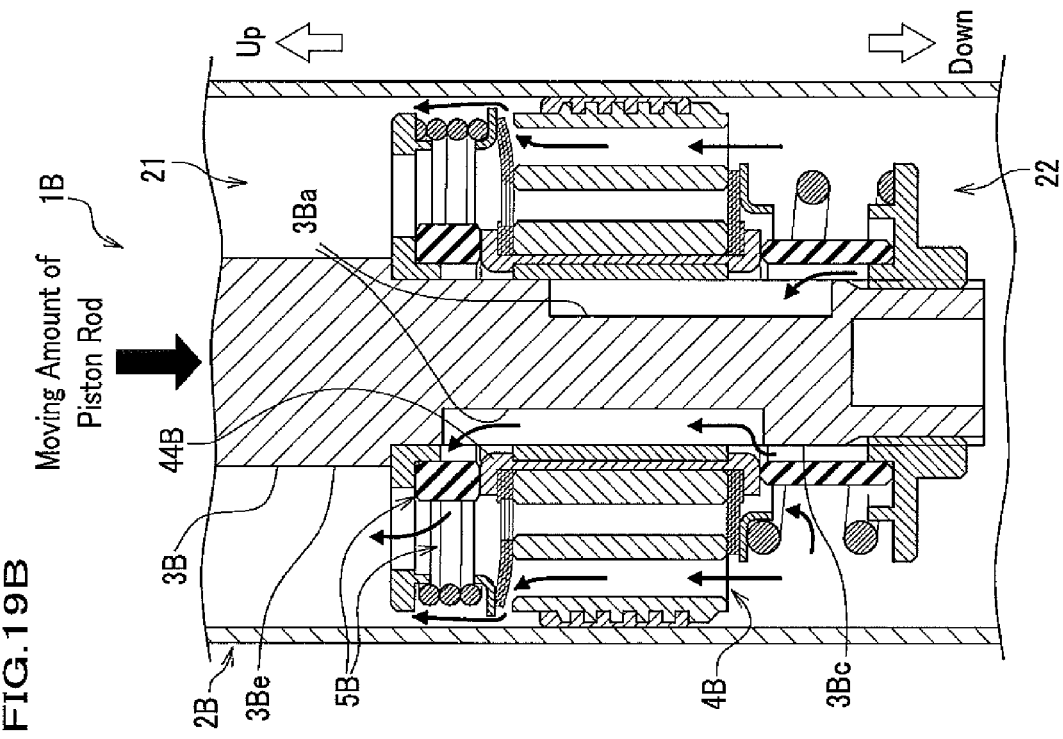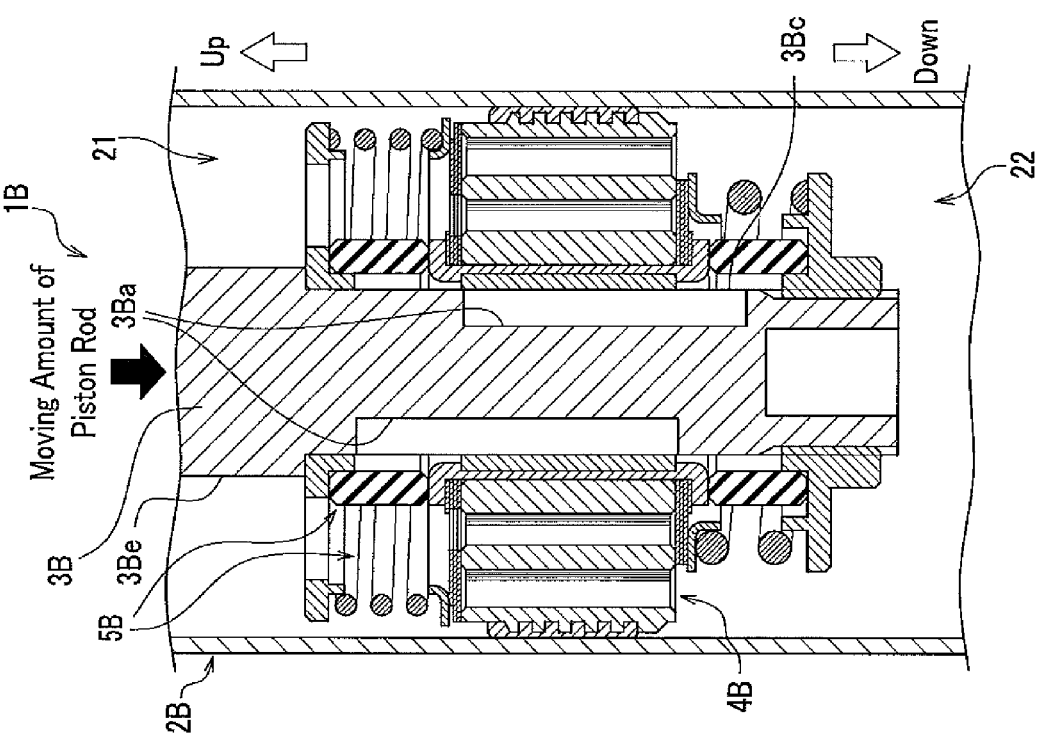

HYDRAULIC SHOCK ABSORBER

CROSS REFERENCE TO RELATED APPLICATIONS

This application claims the foreign priority benefit under 35 U.S.C. §119 of Japanese Patent Application No. 2008-270649 filed on Oct. 21, 2008, Japanese Patent Application No. 2008-305318 filed on Nov. 28, 2008, Japanese Patent Application No. 2008-306301 filed on Dec. 1, 2008, Japanese Patent Application No. 2009-007495 filed on Jan. 16, 2009, and Japanese Patent Application No. 2009-027014 filed on Feb. 9, 2008, the disclosures of which are incorporated herein by reference.

BACKGROUND OF THE INVENTION

1. Field of the Invention

The present invention relates to a hydraulic shock absorber for damping vibration.

2. Description of the Related Arts

A hydraulic shock absorber is used, for example, for damping vibrations of a vehicle body of a road vehicle. In the hydraulic shock absorber, a cylinder is partitioned into first and second fluid chambers with a piston, and a fluid flows between the first and second fluid chambers synchronized with vibration when the vehicle body is vibrated. The vibration is damped by resistance generated when the fluid flows between the first and second fluid chambers. Japanese Patent Application Publication No. 2000-110881 discloses a hydraulic shock absorber in which a though-hole is bored through a piston or a passage is bored through the piston rod in its axial direction to allow the fluid to flow between the first and second fluid chambers.

FIG. 20 is a graph for showing a relationship between the damping force and the piston speed in the conventional hydraulic shock absorber.

Recently, a mechanism for adjusting the damping force characteristic of the hydraulic shock absorber has been required to improve the ride quality of a vehicle. Japanese Patent Application Publication No. 9-291961 discloses a conventional hydraulic shock absorber for a vehicle having such a damping force characteristic that a damping force is largely varied in a fine low speed zone of the piston speed of a piston which moves up and down in a cylinder and the damping force is slightly varied in the low and medium speed zone of the piston speed as shown in FIG. 20.

In this hydraulic shock absorber, a leaf valve does not compress a spring but working oil bends the outer peripheral part of the leaf valve and flows out when the hydraulic shock absorber extends or contracts at the fine low speed, whereby its damping force is generated according to the opening degree of the leaf valve. Thus, the first slope of the damping force is large in the fine low speed zone as shown in FIG. 20.

In a speed zone of the low and medium speed zone or higher, the leaf valve compresses an energizing unit (spring) and the outer peripheral part of the leaf valve is also bent, whereby the leaf valve is fully opened, adjusting the damping force generated. Therefore, the inclination of the damping force in a speed zone of the low and medium speed zone or higher is smaller than the first slope of the damping force in the fine low speed as shown in FIG. 20, which means that the increasing rate of the damping force is decreased in the damping force characteristic of the hydraulic shock absorber.

Moreover, as disclosed in Japanese Patent No. 3479647, a hydraulic shock absorber (vibration damper) is conventionally known which includes a first piston fixed to an end of a piston rod and a second piston which is slidably provided to the piston rod radially inner than the first piston.

In the hydraulic shock absorber disclosed in Japanese Patent No. 3479647, the first piston and the second piston both includes a valve, and when the two valves are opened, a flow passage between fluid chambers in a cylinder is communicated so that the fluid flows between the fluid chambers, whereby the damping force is adjusted. In short, the hydraulic shock absorber is allowed to change its damping force in two-step by the movement amount of the piston rod (amplitude). The second piston is supported by springs fixed to the piston rod at its both ends in the axial direction.

If the movement amount of the piston rod is small, only the valve of the first piston is opened to generate a small damping force, the valve of the second piston is not opened and the spring is compressed in the hydraulic shock absorber. More specifically, the damping force generated in the entire hydraulic shock absorber in the case where the movement amount of the piston rod is small is determined by the damping force generated by the first piston and reaction force of the spring. At this time, the damping force is so small that the first piston hardly moves relative to the cylinder.

If the movement amount of the piston rod is large, the damping force is large in the hydraulic shock absorber since the damping force is generated by both of the first piston fixed to the piston rod and the second piston. At this time, if the floating piston slams into the spring seat, a valve disk is opened, and the piston becomes to move relative to the cylinder.

The reason for providing a communication passage through which a fluid flows between first and second fluid chambers to each of the piston and the piston rod as disclosed in Japanese Patent Application Publication No. 2000-110881 is to realize a variable attenuating force hydraulic shock absorber for changing a damping force for damping vibration according to a vibration status. The communication passage provided to the piston can be readily formed by forming a through-hole in the piston. On the other hand, the manufacturing work of the communication passage provided to the piston rod is complicated and its manufacturing cost is also high because the piston rod has to be formed hollow to form a flow passage extending in the axial direction, and radial direction paths have to be also provided which extend from the outer circumferential surface of the piston rod to the flow passage extending in the axial direction. As described above, at least two passages are desired as a communication passage. Thus, at least one communication passage is desired other than the communication passage formed by the through-hole provided in the piston. The manufacturing work of the conventional communication passage provided in the piston rod is so complicated that a communication passage which can replace the conventional communication passage has been desired.

FIGS. 21A and 21B are graphs showing damping force characteristics of the hydraulic shock absorber disclosed in Japanese Patent Application Publication No. 9-291961. FIG. 21A shows a relationship between the piston speed and the damping force. FIG. 21B shows a relationship between the damping force and time.

As shown in FIG. 21A, the hydraulic shock absorber disclosed in Japanese Patent Application Publication No. 9-291961 prevents a deterioration of the ride quality by making its damping force to be smaller when the piston speed is high, compared to a hydraulic shock absorber in which the spring is not provided to the piston.

In the hydraulic shock absorber disclosed in Japanese Patent Application Publication No. 9-291961, however, the ride quality of a vehicle is deteriorated when a vehicle runs over large bumps on a road which is not maintained because the damping force is sharply increased in proportion to the piston speed as shown in FIG. 21B.

The technique of Japanese Patent Application Publication No. 9-291961 would give "rigid-feeling" which is attributed to the magnitude of the damping force because the damping force is increased sharply (i.e. a large damping force is generated rapidly when a large input load is applied), and this deteriorates the ride quality of a vehicle.

The hydraulic shock absorber disclosed in Japanese Patent No. 3479647 would give "step feeling" because the damping force characteristic is switched by the opening or closing of the valves provided in the second piston and resistance is varied stepwise at the time when the damping force characteristic is switched. This deteriorates the ride quality of a vehicle.

Since the hydraulic shock absorber includes a second piston in addition to the first piston which is fixed to the piston rod, the hydraulic shock absorber becomes long in the axial direction of the rod, which disadvantageously makes the entire size of the hydraulic shock absorber larger. Further, the hydraulic shock absorber has disadvantages that the number of components and assembly man-hours are large so that its cost is increased and friction resistance of the piston when the piston rod slides is increased because the first piston and the second piston are provided in the cylinder.

SUMMARY OF THE INVENTION

The present invention has been made in view of the above problems, and a first object thereof is to provide a hydraulic shock absorber including a piston rod which has a communication passage that can be formed easily.

A second object of the present invention is to provide a hydraulic shock absorber which is allowed to enhance a ride quality of a vehicle by preventing its damping force from sharply increasing when the vehicle run over large bumps on an un-maintained road and a large input is instantaneously applied to the vehicle.

A third object of the present invention is to provide a hydraulic shock absorber whose configuration is simple and which is allowed to reduce friction resistance of the piston when the piston rod slides and to enhance the ride quality of a vehicle by continuously changing its damping force.

A first aspect of the present invention provides a hydraulic shock absorber which includes: a piston which is slidably fitted into a cylinder and partitions the cylinder into first and second fluid chambers; and a piston rod which is connected to the piston and slidably penetrates through an end wall of the cylinder, wherein the piston rod penetrates through the piston and includes on the outer circumferential surface of the piston rod at least one groove which communicates between the first and second fluid chambers, and the first and second fluid chambers are communicated with each other through the at least one groove.

The aforementioned hydraulic shock absorber may further include an opening controlling unit for controlling an area of an opening of the at least one groove which faces to the first or second fluid chamber according to a sliding state of the piston rod relative to the cylinder.

In the aforementioned hydraulic shock absorber, the opening controlling unit may include: a moving unit which moves in an axial direction of the piston rod to control the area of the opening; and at least one energizing unit which is supported by the piston or the piston rod and energizes the moving unit in the axial direction, and wherein the moving unit moves against an energizing force of the energizing unit according to the sliding state of the piston rod to control the area of the opening.

The aforementioned hydraulic shock absorber may further include a cover which is arranged on the outer circumferential surface of the piston rod at a position adjacent to the piston, wherein the cover includes a through-hole right above the at least one groove, and the moving unit moves over the through-hole.

The aforementioned hydraulic shock absorber may further include a step portion on the outer circumferential surface of the piston rod at a position displaced from both ends of the at least one groove in an axial inner direction, and the piston is arranged to be displaced from the both ends of the groove by the step portion.

In the aforementioned hydraulic shock absorber, the piston may be provided to be movable relative to the piston rod in the cylinder and the piston comprises a first communication passage which communicates between the first and the second fluid chambers, and the hydraulic shock absorber further includes a valve for opening or closing the first communication passage and a piston movement amount controlling unit for controlling a movement amount of the piston according to a moving speed of the piston rod.

In the aforementioned hydraulic shock absorber, the at least one groove may be arranged at a position radially inner side of the piston as a second communication passage which communicates between the first and second fluid chambers, and the piston movement amount controlling unit controls a communication state of the second communication passage between the first and second fluid chambers according to the sliding state of the piston.

In the aforementioned hydraulic shock absorber, the piston movement amount controlling unit is supported by the piston or the piston rod and includes an energizing unit for energizing the piston in the axial direction, and the piston slides against an energizing force of the energizing unit according to the moving speed of the piston rod to control an area of an opening of the second communication passage which faces to the first or second fluid chamber.

The aforementioned hydraulic shock absorber may further include a sliding part which sandwiches the piston and the valve in an axial direction of the piston rod, holds the piston and the valve from a radial inner side of the sliding part, and slides along the outer circumferential surface of the piston rod to open or close the second communication passage.

The aforementioned hydraulic shock absorber may further include a valve controlling unit for controlling an opening and closing state of the valve according to the movement amount of the piston.

In the aforementioned hydraulic shock absorber, the valve controlling unit may include: a first elastic unit which presses the piston in a direction opposite to a sliding direction of the piston with a first energizing force which is continuously varied according to an amount of the slide of the piston in an opposite direction of a sliding direction of the piston rod, a second elastic unit which presses the valve with a second energizing force which is continuously varied according to the sliding amount of the piston in the same direction as that of the first energizing force, and the valve opens the first communication passage if a force applied to the valve by a pressure of the fluid passing through the first communication passage becomes larger against the second energizing force.

In the aforementioned hydraulic shock absorber, the valve controlling unit may make the valve to close the first communication passage during the sliding of the piston if a first pressure is larger than a second pressure and make the valve to open the first communication passage if the first pressure is smaller than the second pressure, wherein the first pressure is a pressure for making the valve to open the first communication passage against the second energizing force and the second pressure is a pressure for making the piston to slide against the first energizing force and the second energizing force.

The aforementioned hydraulic shock absorber may further include a sliding part which is fitted into the piston and the valve from the radial inner side of the piston, sandwich the piston and the valve in the axial direction wherein the sliding part slide along the piston rod with the inner circumferential surface of the sliding part being in contact with the piston rod.

BRIEF DESCRIPTION OF THE DRAWINGS

FIG. 3A is a cross sectional view of the piston and components around the piston showing a fluid flow when the piston rod moves in a low acceleration and a high damping force is generated in the hydraulic shock absorber of the first embodiment.

FIG. 3B is a perspective view of the piston and components around the piston showing a fluid flow when the piston rod moves in a low acceleration and a high damping force is generated in the hydraulic shock absorber of the first embodiment.

FIG. 4A is a cross sectional view of the piston and components around the piston showing a fluid flow when the piston rod moves in a high acceleration and a low damping force is generated in the hydraulic shock absorber of the first embodiment.

FIG. 4B is a perspective view of the piston and components around the piston showing a fluid flow when the piston rod moves in a high acceleration and a low damping force is generated in the hydraulic shock absorber of the first embodiment.

FIG. 5A is a cross sectional view of a piston and components around the piston showing a fluid flow when the piston rod according to modification of the first embodiment moves in a low acceleration and a low damping force is generated in a hydraulic shock absorber of the modification.

FIG. 5B is a cross sectional view of the piston and components around the piston showing a fluid flow when the piston rod according to the modification of the first embodiment moves in a high acceleration and a high damping force is generated in the hydraulic shock absorber.

FIG. 10A is an enlarged cross sectional view of the hydraulic shock absorber of the second embodiment showing its operation when an input load applied to the piston rod is small.

FIG. 10B is an enlarged cross sectional view of the hydraulic shock absorber of the second embodiment showing its operation when an input load applied to the piston rod is large.

FIG. 19A is an enlarged cross sectional view of an essential part of the hydraulic shock absorber of another modification showing its operation when an input load applied to the piston rod is small.

FIG. 19B is an enlarged cross sectional view of an essential part of the hydraulic shock absorber of another modification showing its operation when an input load applied to the piston rod is large.

DETAILED DESCRIPTION OF THE PREFERRED EMBODIMENTS

First Embodiment

Figure 1:
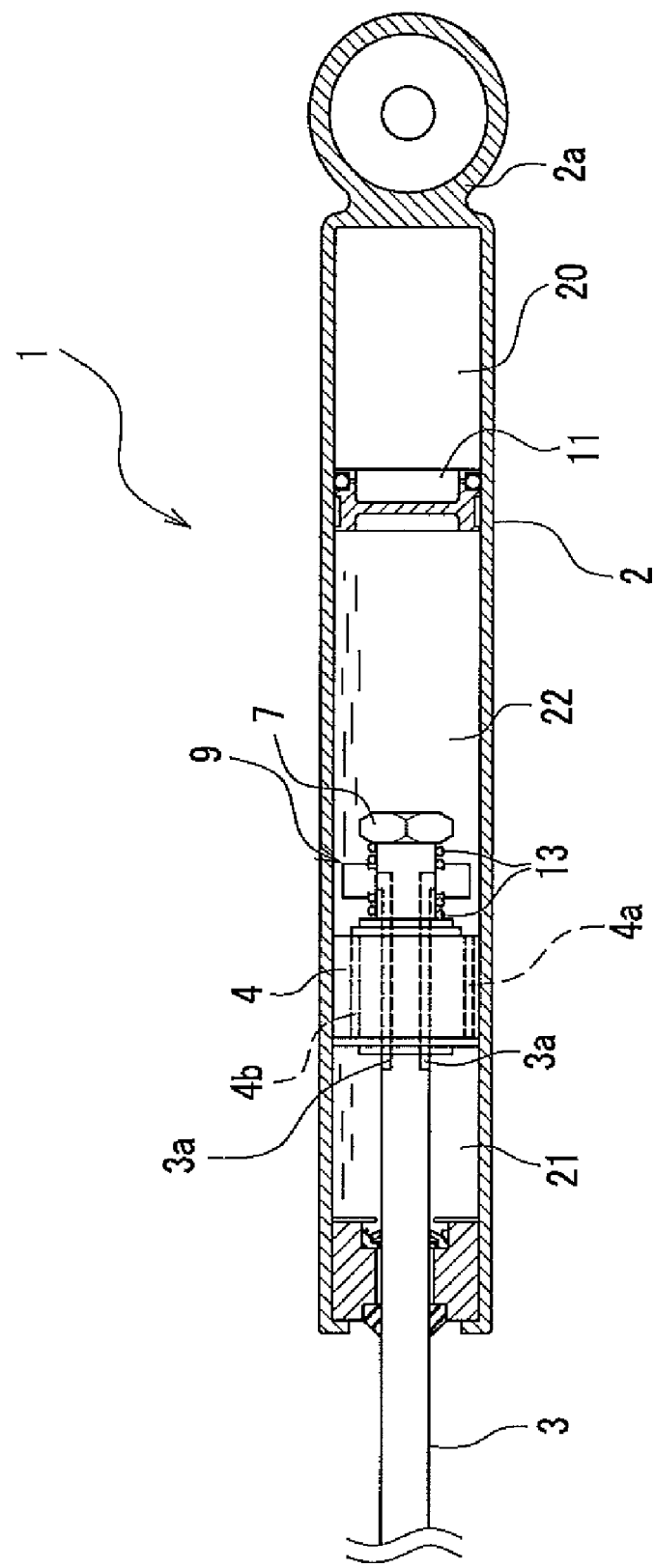
FIG. 1 is a vertical cross sectional view of a hydraulic shock absorber according to a first embodiment of the present invention.

As shown in FIG. 1, a hydraulic shock absorber 1 is a so-called monotube type (de-Carbon) shock absorber, however, the present invention may also be applied to a twintube type shock absorber. The hydraulic shock absorber 1 includes a cylindrical cylinder 2 in which a fluid such as oil or MRF (Magneto-Rheological Fluid) is filled, a piston 4 which is slidably fitted into the cylinder 2 and partitions the cylinder 2 into a first fluid chamber 21 and a second fluid chamber 22, a piston rod 3 which is connected to a piston 4 and slidably penetrates through an end wall of the cylinder 2, an opening controlling unit 9 which is provided to the piston rod 3, a nut 7 for fixing the opening controlling unit 9 to the piston rod 3, and a free piston 11 which partitions the second fluid chamber 22 and a high pressure gas chamber 20.

The cylinder 2 includes an eye piece 2a at its end portion which is opposed to the end portion having a bore through which the piston rod 3 penetrates. If the hydraulic shock absorber 1 is employed for a vehicle suspension system, for example, a bolt (not shown) is fittingly inserted into the eye piece 2a, and the bolt is connected to a trailing arm, which is a wheel side member. An end portion (not shown) of the piston rod 3 is connected to a damper base (the upper part of a wheel house), which is a vehicle body side member.

The piston rod 3 penetrates through the piston 4. Grooves 3a (second communication passage) for communicating the first fluid chamber 21 with the second fluid chamber 22 are provided on the outer circumferential surface of the piston rod 3. The first fluid chamber 21 and the second fluid chamber 22 are communicated with each other through these grooves 3a. Details of these components are described later.

The opening controlling unit 9 controls the areas of openings of grooves 3a which face to the second fluid chamber 22 based on the sliding state of the piston rod 3 to the cylinder 2. Details of this construction are described later. The piston 4 is provided with a plurality of communication passages 4a, 4b (first communication passage) for communicating the first fluid chamber 21 with the second fluid chamber 22.

The free piston 11 keeps the high pressure gas chamber 20 airtight by an O ring. If pressure difference is generated between the second fluid chamber 22 and the high pressure gas chamber 20, the free piston 11 slides freely inside the cylinder 2 so as to eliminate the pressure difference.

Figure 2:
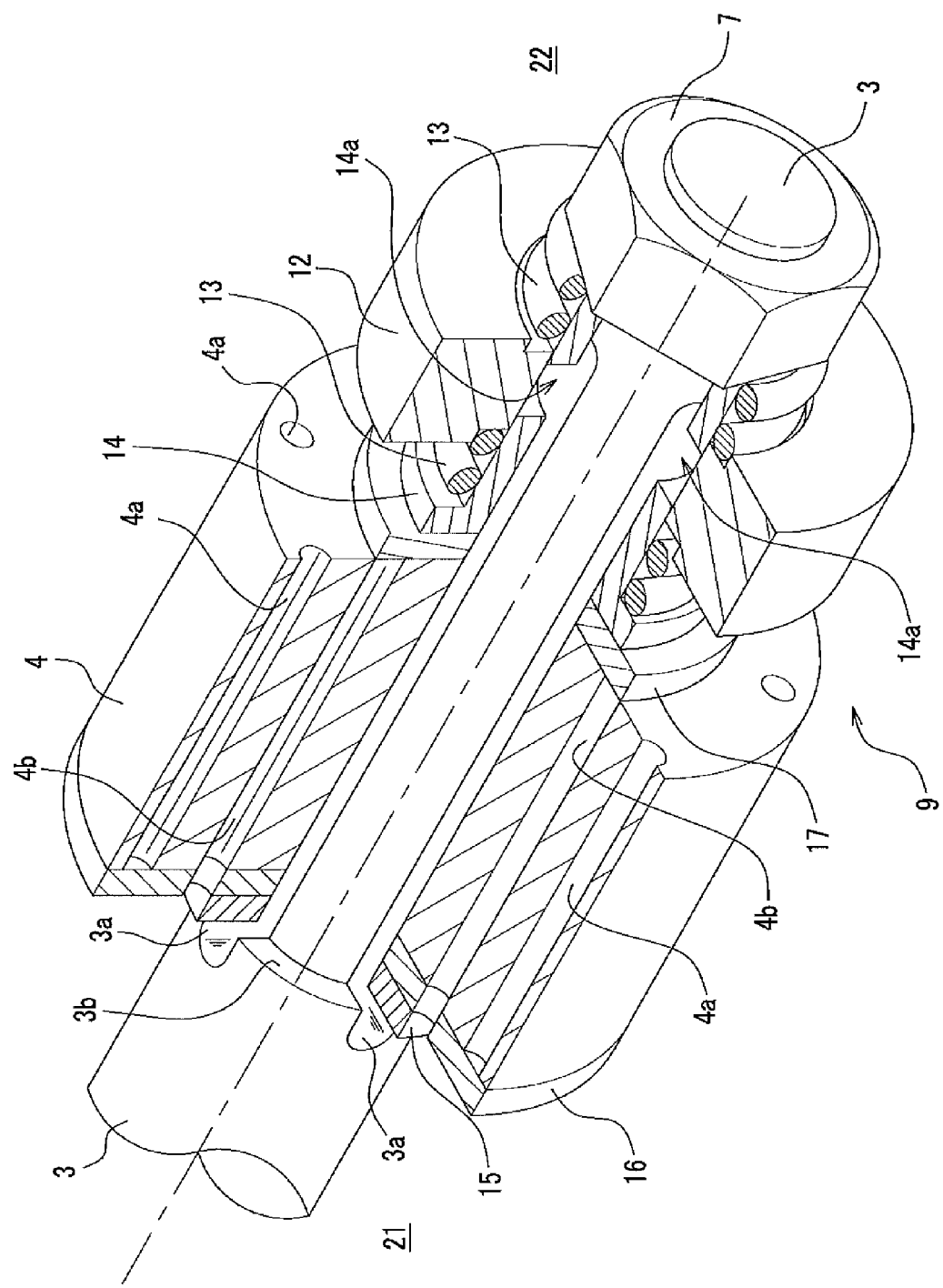
FIG. 2 is a perspective cross sectional view of a piston and components around the piston which constitute the hydraulic shock absorber of the first embodiment of the present invention.

FIG. 2 is a cross sectional perspective view of the piston 4 and components around the piston 4. A plurality of the grooves 3a is formed on the outer circumferential surface of the piston rod 3. Each of the plurality of the grooves 3a is formed parallel to the axis direction of the piston rod 3. Further, each of the plurality of the grooves 3a selectively communicates the first fluid chamber 21 with the second fluid chamber 22. The length of the grooves 3a is longer than that of the piston 4. The intermediate parts of the grooves 3a are covered by the piston 4; however, both ends of the grooves 3a protrude from the piston 4. One end of each of the grooves 3a is disposed on the side of the first fluid chamber 21 and the other end of each of the grooves 3a is disposed on the side of the second fluid chamber 22.

A step portion 3b is formed on the outer circumferential surface of the piston rod 3 at a position between the both ends of the grooves 3a in the axial direction. By taking the step portion 3b as a boundary, the diameter of the piston rod 3 on the side of the piston 4 is made smaller than that of the piston rod 3 on the opposite side. Since the height of the step portion 3b is shorter than the depth of the grooves 3a, the grooves 3a are still formed in the thinner part of the piston rod 3.

A washer 15, a disk valve (compression) 16, a piston 4, a disk valve (tension) 17, a cover 14, an energizing unit 13, a moving unit 12, and an energizing unit 13 are fitted into the thinner part of the piston rod 3 in this order. Further, these components are fixed by the nut 7 to prevent them from being dropped from the piston rod 3. It is to be noted that the cover 14, the energizing unit 13, the moving unit 12, and the energizing unit 13 constitute the opening controlling unit 9. The energizing unit 13, the moving unit 12, and the energizing unit 13 are fit into the cylindrical part of the cover 14 in this order.

Since the step portion 3b is displaced from the both ends of the grooves 3a, the piston 4 can be positioned away from the both ends of the grooves 3a by the step portion 3b. Thus, the openings of the grooves 3a can be exposed to the first fluid chamber 21. Further, ends of the grooves 3a opposite to the openings can also be exposed to the second fluid chamber 22 as openings of the grooves 3a since the length of the grooves 3a is longer than that of the piston 4. Thus, the groove 3a which communicate between the first and second fluid chambers can be formed reliably. The piston rod 3 penetrates through the piston 4. The grooves 3a formed on the outer circumferential surface of the piston rod 3 communicate the first fluid chamber 21 with the second fluid chamber 22 through the piston 4. The first fluid chamber 21 and the second fluid chamber 22 can be communicated with each other through the grooves 3a, and the grooves 3a function as second communication passages through which the fluid flows between the first fluid chamber 21 and the second fluid chamber 22. Generally, grooves such as the grooves 3a can be easily formed on a surface such as the outer circumferential surface of the piston rod 3.

The cover 14, constituting a component part of the opening controlling unit 9, is provided adjacent to the piston 4 on the outer circumferential surface of the piston rod 3. The cover 14 includes a cylindrical part and a flange part. The opening controlling unit 9 includes a moving unit 12 which moves in the axial direction of the piston rod 3 so as to adjust the opening areas of the grooves 3a and the energizing unit 13, 13 which are supported by the piston 4 or the piston rod 3 and energize the moving unit 12 in the axial direction of the piston rod 3. The cylindrical part is fitted into the piston rod 3, and the flange part is coupled to the cylindrical part and presses the disk valve (tension) 17 to the piston 4. Through-holes 14a are formed on the cylindrical part of the cover 14 at positions right above the grooves 3a and away from the piston 4.

The moving unit 12 is energized and supported by a pair of energizing units 13, 13 which sandwichingly hold the moving unit 12 such that the moving unit 12 can move over the through-hole 14a. The moving unit 12 moves in the axial direction of the piston rod 3 so as to adjust the opening areas of the grooves 3a.

The energizing unit 13 is supported by the piston 4 or the piston rod 3 and energizes the moving unit 12 in the axial direction of the piston rod 3. A coil spring may be used as the energizing unit 13 as shown in FIG. 2; however, the energizing unit 13 is not limited to the coil spring and may be other springs or an elastic body such as a rubber.

When the moving unit 12 is moved and the through-holes 14a are exposed to the second fluid chamber 22, the grooves 3a is communicated to the second fluid chamber 22 through the through-hole 14a. Thus, the openings of the grooves 3a to the second fluid chamber 22 may be regarded as the through-holes 14a.

If the piston rod 3 is vibrated (moved) in accordance with the sliding condition of the piston rod 3 relative to the cylinder 2 (the extensible acceleration of the hydraulic shock absorber 1), so called inertia force is applied to the moving unit 12 to keep the position of the moving unit 12 as it is, and thus the positional relationship of the moving unit 12 and the piston rod 3, or more specifically, the positional relationship of the moving unit 12 and the through-hole 14a is changed since the moving unit 12 is supported by the energizing unit 13, 13 at the both ends of the moving unit 12 in the axial direction of the piston rod 3.

The counteraction of this inertia force is the energizing force of the energizing unit 13. The moving unit 12 is moved by this energizing force, and thus the opening areas of the grooves 3a are adjusted.

Opening and closing state of the opening (through-hole 14a), or more specifically, the area of the opening is varied according to the positional relationship of the moving unit 12 and the opening (through-hole 14a). The resistance to the fluid flow can thus be varied, which allows to adjust the damping force of the hydraulic shock absorber 1.

Since the through-hole 14a is provided away from the piston 4, the moving unit 12 which is disposed to cover the through-hole 14a is also provided away from the piston 4. The moving unit 12 is allowed to be moved to or away from the piston 4 in the axial direction of the piston rod 3 without being interfered with by the piston 4. Thus, it is possible to adjust the damping force of the hydraulic shock absorber 1 regardless of the directions of the movement of the moving unit 12 caused by the vibration of the piston rod 3.

The piston 4 includes communication passages 4a, 4b which communicate the first fluid chamber 21 with the second fluid chamber 22. Since the communication passages 4a, 4b communicate the first fluid chamber 21 with the second fluid chamber 22, the communication passages 4a, 4b can function as a first communication passage through which the fluid flows between the first fluid chamber 21 and the second fluid chamber 22. The communication passages 4a, 4b just penetrates through the piston 4. Thus, it is possible to readily form the communication passages 4a, 4b at low cost. Since the first communication passages of the communication passages 4a, 4b which penetrate through the piston 4 and the second communication passages of the grooves 3a provided on the outer circumferential surface of the piston rod 3 can both be provided to the hydraulic shock absorber 1 as described above, a variable attenuating force hydraulic shock absorber can be manufactured easily at low cost.

The communication passages 4a, 4b are a communication passage 4a whose opening on the side of the first fluid chamber 21 is covered by the disk valve (compression) 16 and a communication passage 4b whose opening on the side of the second fluid chamber 22 is covered by the disk valve (tension) 17.

The fluid flow in the case where the piston rod 3 moves at lower acceleration and a high damping force is generated by the hydraulic shock absorber 1 is shown as arrows in FIGS. 3A and 3B. If the acceleration of the piston rod 3 (the extensible acceleration of the hydraulic shock absorber 1) is below a predetermined value (low acceleration), the moving unit 12 is energized by the energizing unit 13 and covers the through-hole 14a (opening of the grooves 3a) completely. Thus, the fluid does not flow through the grooves 3a (second communication passage). The fluid moves from the second fluid chamber 22 to the first fluid chamber 21 through the communication passage 4a (the first communication passage) which is not covered by the disk valve (tension) 17, pressingly bending the disk valve (compression) 16. In this case, a high damping force is generated in the hydraulic shock absorber 1 because the communication passages through which the fluid can pass is only the first communication passages.

The fluid flow in the case where the piston rod 3 moves at high acceleration and a low damping force is generated by the hydraulic shock absorber 1 are shown as arrows in FIGS. 4A and 4B.

If the acceleration of the piston rod 3 (the extensible acceleration of the hydraulic shock absorber 1) exceeds a predetermined value (high acceleration), the moving unit 12 is moved against the energizing force of the energizing unit 13 and opens the through-hole 14a (the opening of the grooves 3a).

Thus, the fluid also flows through the grooves 3a (the second communication passage). In this case, the damping force generated by the hydraulic shock absorber 1 is decreased since the communication passages through which the fluid can pass are the first communication passage and the second communication passage. The damping force can thus be adjusted according to the acceleration of the piston rod 3 (the extensible acceleration of the hydraulic shock absorber 1).

Modification of the First Embodiment

FIGS. 5A and 5B are cross-sectional views of the piston 4 and parts around the piston 4 of a hydraulic shock absorber 1 according to a modification of the first embodiment of the present invention. FIG. 5A shows as arrows the fluid flow in the case where the piston rod 3 moves at low acceleration and a low damping force, which is different from that in the first embodiment, is generated in the hydraulic shock absorber 1. FIG. 5B also shows as arrows the fluid flow in the case where the piston rod 3 moves at high acceleration and a high damping force, which is different from that of the first embodiment, is generated in the hydraulic shock absorber 1.

In this modification, if the acceleration of the piston rod 3 (the extensible acceleration of the hydraulic shock absorber 1) is below a predetermined value (low acceleration), the moving unit 12 is energized by the energizing unit 13 and opens the through-hole 14a (the opening of the grooves 3a) as shown in FIG. 5A. Thus, the fluid flows through the grooves 3a (the second communication passage).

In this case, the damping force generated by the hydraulic shock absorber 1 is decreased since the communication passages through which the fluid can pass are the first communication passage and the second communication passage. On the other hand, if the acceleration of the piston rod 3 (the extensible acceleration of the hydraulic shock absorber 1) exceeds a predetermined value (high acceleration), the moving unit 12 is moved against the energizing force of the energizing unit 13 and closes the through-hole 14a (the opening of the grooves 3a). Thus, the fluid is prohibited from flowing through the grooves 3a (second communication passage). In this case, a high damping force is generated in the hydraulic shock absorber 1 because the communication passages through which the fluid can pass is only the first communication passages. In accordance with the modification, the damping force can be adjusted according to the acceleration of the piston rod 3 (the extensible acceleration of the hydraulic shock absorber 1).

Second Embodiment

Next, a hydraulic shock absorber 1A according to a second embodiment of the present invention is described with reference to FIGS. 6 to 12. The direction such as an up-down direction of the hydraulic shock absorber 1A according to the second embodiment of the present invention is changed depending on its installation condition. The following example of the hydraulic shock absorber 1A is explained in which the piston rod 3A is disposed at an upper side and the cylinder 2A is disposed at a lower side. Components corresponding to those of the first embodiment are assigned similar reference numerals, and descriptions thereof are omitted.

Figure 6:
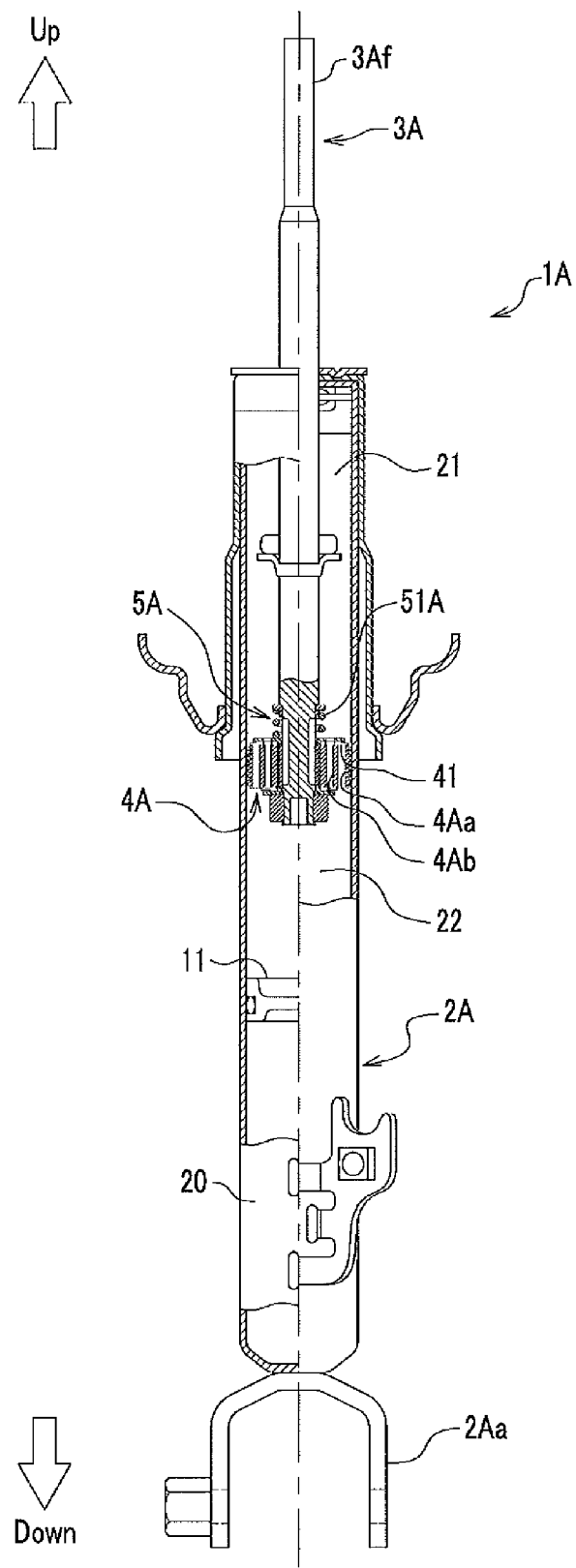
FIG. 6 is a cross-sectional view of an essential part of a hydraulic shock absorber of a second embodiment of the preset invention.
Figure 7:
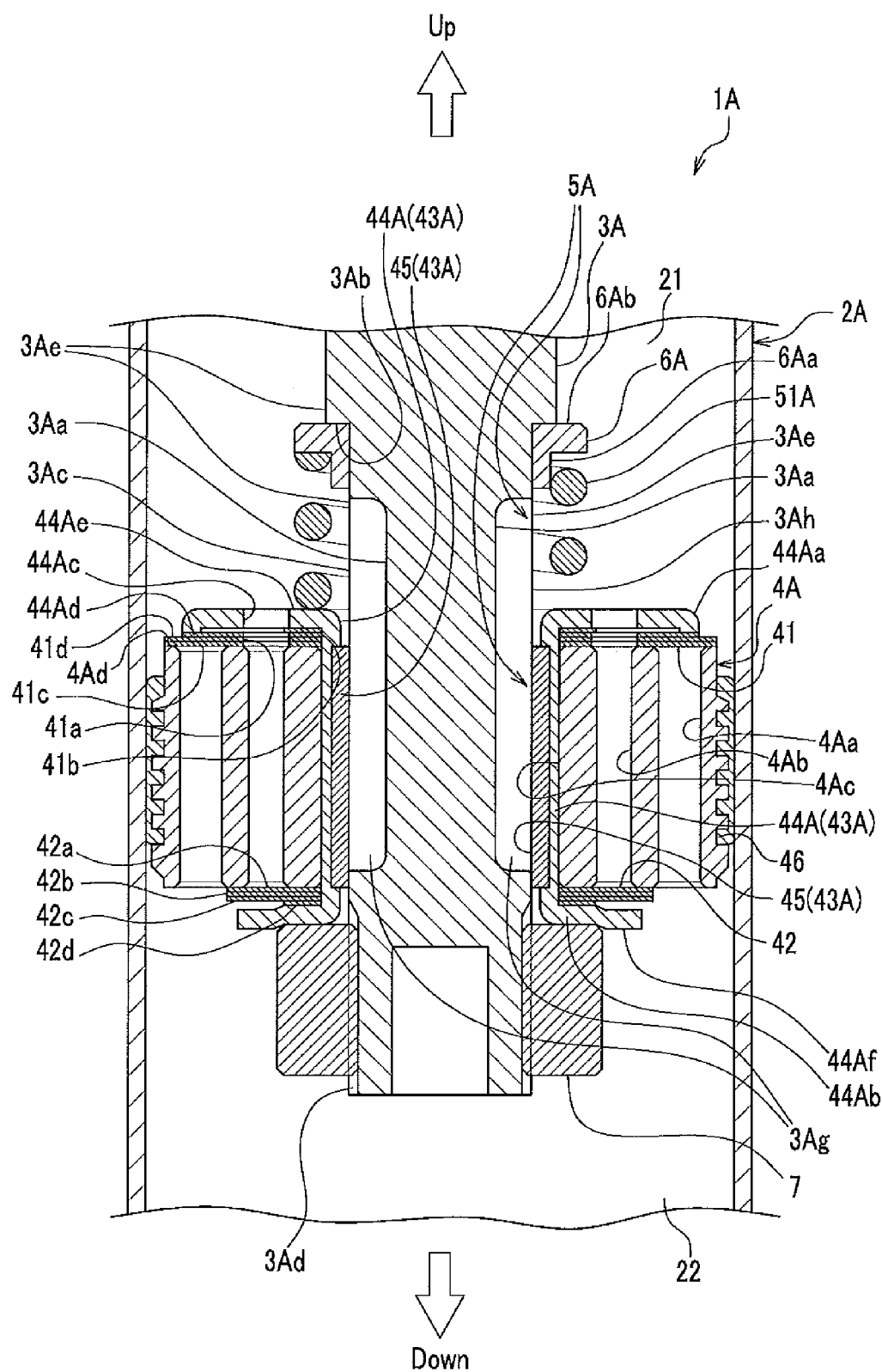
FIG. 7 is an enlarged cross sectional view of an essential part of the hydraulic shock absorber of the second embodiment.
Figure 8:
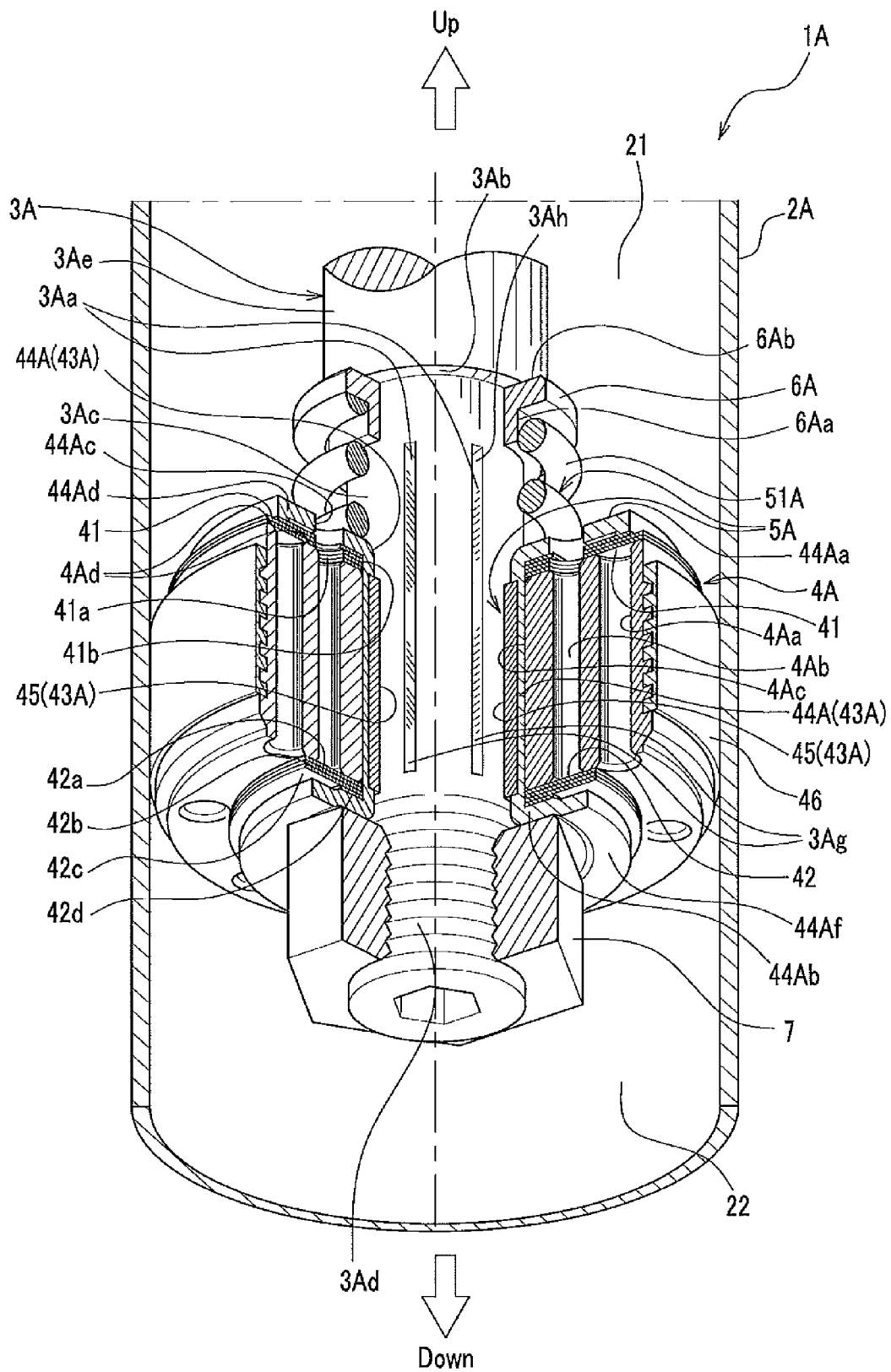
FIG. 8 is an enlarged perspective view of an essential part of the hydraulic shock absorber of the second embodiment showing a cross-section of a part of the hydraulic shock absorber.

As shown in FIGS. 7 and 8, the hydraulic shock absorber 1A includes a cylinder 2A, a piston rod 3A, a piston 4A, a first communication passage 4Aa, a second communication passage 3Aa, a third communication passage 4Ab, a first leaf valve 41, a second leaf valve 42, a sliding portion 43A, a valve holding member 44A, a piston movement adjusting unit 5A, an energizing unit 51A, a spring sheet 6A, and a nut 7. In the hydraulic shock absorber 1A, a vehicle body side mounting portion 3Af (see FIG. 6) at the upper end of the piston rod 3A which is inserted into the cylinder 2A is connected to a vehicle body, and an eye piece 2Aa (see FIG. 6) at the lower end of the cylinder 2A is connected to the side of the wheel axis.

The cylinder 2A is comprised of a cylinder which is filled with a liquid such as oil or a fluid comprising a gas such as air and whose top and bottom ends are closed (see FIG. 6). Similarly to the cylinder 2 of the first embodiment, the cylinder 2A is partitioned into the high pressure gas chamber 20, the first fluid chamber 21, and the second fluid chamber 22 by the piston 4A and the free piston 11 provided in the cylinder 2A.

As shown in FIGS. 7 and 8, the first fluid chamber 21 and the second fluid chamber 22 are formed similarly to those of the first embodiment. The fluid in the cylinder 2A flows to the first fluid chamber 21 from the second fluid chamber 22 through the first communication passage 4Aa, which is described later, when the first leaf valve 41 is opened by the movement of the piston 4A. The fluid also flows to the first fluid chamber 21 from the second fluid chamber 22 through the second communication passage 3Aa when a slide bush 45 (sliding portion 43A) having a valve function is moved to open the second communication passage 3Aa. Furthermore, the fluid flows to the second fluid chamber 22 from the first fluid chamber 21 through the third communication passage 4Ab formed in the piston 4A when the second leaf valve 42 is opened.

The piston rod 3A is provided in the cylinder 2A in such a manner that the piston rod 3A is vertically movable along the cylinder 2A. The upper side of the piston rod 3A, which is the side of the vehicle body side mounting portion 3Af (see FIG. 6), is exposed from the cylinder 2A, and the lower end of the piston rod 3A penetrates through the upper end of the cylinder 2A and is positioned inside the cylinder 2A. A step portion 3Ab, a smaller diameter portion 3Ac, a male screw portion 3Ad, an outer circumferential surface 3Ae, second communication passages 3Aa, and openings 3Ag, 3Ah (see FIG. 10B), which are described later, are formed at the lower end of the piston rod 3A.

The step portion 3Ab is a part which a spring sheet 6A externally fitted to the smaller diameter portion 3Ac comes in contact with and is engaged with. The step portion 3Ab is formed at the upper end of the smaller diameter portion 3Ac. The smaller diameter portion 3Ac is a portion to which the spring sheet 6A, the slide bush 45 and the energizing unit 51A are slidably fitted. The male screw portion 3Ad is a portion with which a female screw part of the nut 7 is engaged, and is formed at the bottom end of the piston rod 3A.

The outer circumferential surface 3Ae is a whole circumferential surface of the piston rod 3A and includes the smaller diameter portion 3Ac.

The second communication passages 3Aa are passages through which the fluid passes and are formed on the smaller diameter portion 3Ac of the piston rod 3A. The second communication passages 3Aa are comprised of a plurality of grooves formed on the outer circumferential surface 3Ae of the piston rod 3A in the axial direction of the piston rod 3A. The second communication passages 3Aa are groove-like flow passages for communicating the first fluid chamber 21 with the second fluid chamber 22, and are formed on a radially inner side of the piston 4A.

The openings 3Ag, 3Ah (see FIG. 10B) are openings of the second communication passages 3Aa which are opened or closed by the slide bush 45 of the piston 4A externally fitted to the smaller diameter portion 3Ac. The opening 3Ag (see FIG. 10B) is a lower side opening of the second communication passage 3Aa which communicates with the second fluid chamber 22. The opening 3Ah is an upper side opening of the second communication passage 3Aa which communicates with the first fluid chamber 22.

As shown in FIGS. 7 and 8, the piston 4A is a sliding piston which is guided along the piston rod 3A in the cylinder 2A and is movable relative to the piston rod 3A in a vertical direction. The piston 4A is formed to be thick disk-shape, and a plurality of the first communication passages 4Aa, a plurality of third communication passages 4Ab and a through-hole 4Ac are bored in the piston 4A. The piston 4A is provided with a first leaf valve 41 for opening and closing the first communication passage 4Aa on the side of the first fluid chamber 21. The piston 4A is also provided with a second leaf valve 42 for opening or closing the third communication passage 4Ab on the side of the second fluid chamber 22. The sliding portion 43A is internally fitted to the inner wall surface of the through-hole 4Ac which is bored at the center part of the piston 4, and the piston ring 46 is externally fitted to the outer circumferential surface 3Ae. The piston 4A partitions the cylinder 2A into the first fluid chamber 21 and the second fluid chamber 22.

When a wheel is bound, the piston 4A absorbs an impact by: an orifice effect generated when the fluid in the second fluid chamber on the lower side of the cylinder 2A is pressed to flow to the first fluid chamber 21 on the upper side of the cylinder 2A through the first communication passages 4Aa and the second communication passages 3Aa: and the compressing elasticity of the energizing unit 51A. When the wheel is rebound, the piston 4A damps the input by an orifice effect generated when the fluid in the first fluid chamber 21 on the upper side of the cylinder 2A is pressed by the piston 4A to flow to the second fluid chamber on the lower side of the cylinder 2A through the third communication passage 4Ab.

The piston 4A is movably fitted to the smaller diameter portion 3Ac of the piston rod 3A in the axial direction of the piston rod 3A with the valve holding member 44A and the slide bush 45 being interposed therebetween. The upper side of the piston 4A which faces to the first fluid chamber 21 is always pressed by the energizing unit 51A and the lower side of the piston 4A which faces to the second fluid chamber 22 is always pressed by the reaction force to the spring force of the energizing unit 51A so that the vertical movement of the piston 4A is elastically regulated between the spring sheet 6A which is engaged with the step portion 3Ab formed at the upper end of the smaller diameter portion 3Ac and the nut 7 fixed at the lower end of the smaller diameter portion 3Ac.

The first communication passage 4Aa (communication passage) is a flow passage bored through the piston 4A in its axial direction at a position closer to the outer peripheral side, and its upper side opening is normally closed by the first leaf valve 41. When the first leaf valve 41 is opened, the second fluid chamber 22 and the first fluid chamber 21 is communicated with each other, and the fluid in the second fluid chamber 22 flows to the first fluid chamber 21 through the first communication passage 4Aa.

The third communication passage 4Ab (communication passage) is a flow passage bored through the piston 4A in its axial direction at a position closer to the center of the piston 4A, and its lower side opening is normally closed by the second leaf valve 42. When the second leaf valve 42 is opened, the second fluid chamber 22 and the first fluid chamber 21 is communicated with each other, and the fluid in the first fluid chamber 21 flows to the second fluid chamber 22 through the third communication passage 4Ab.

Figure 9A:
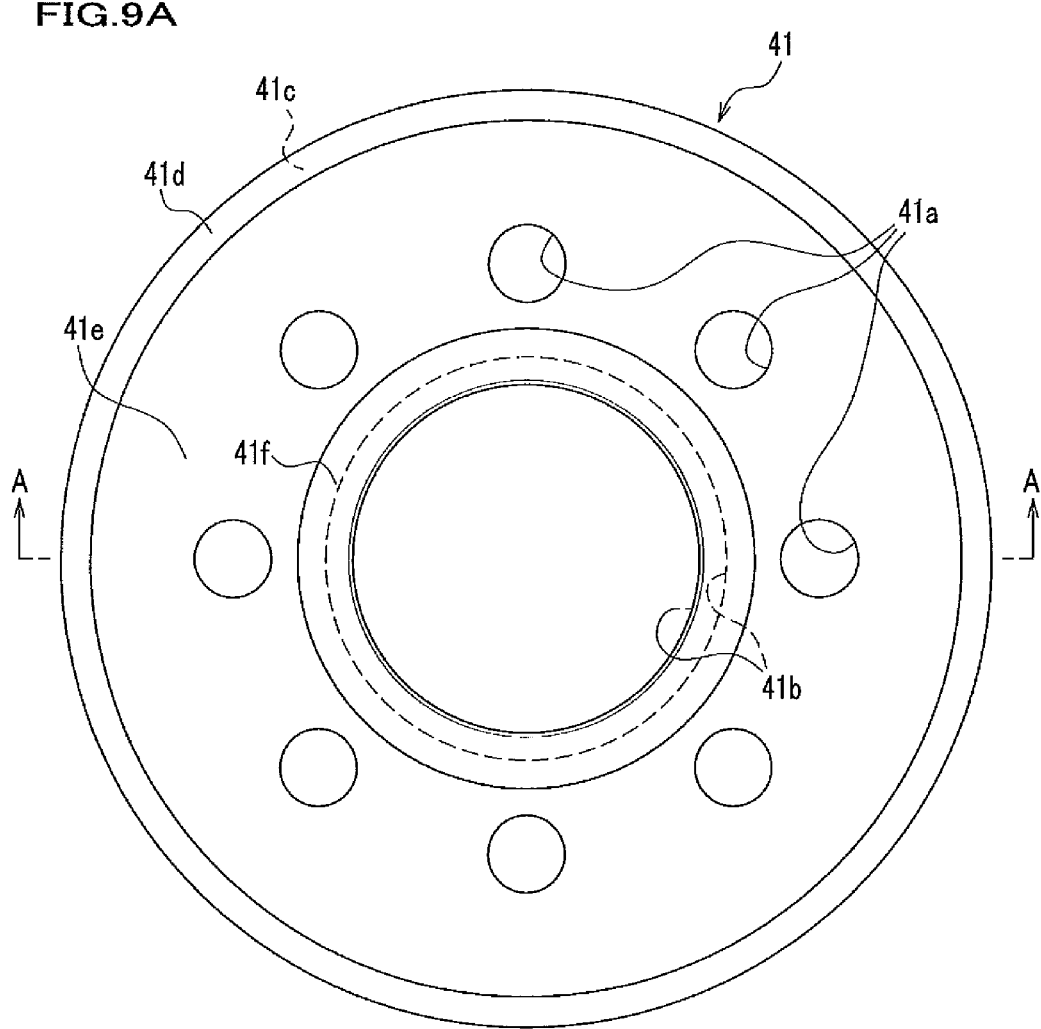
FIG. 9A is an enlarged plain view of a first leaf valve showing a shape of the first leaf valve before the first leaf valve is installed in the hydraulic shock absorber according to the second embodiment.
Figure 9B:
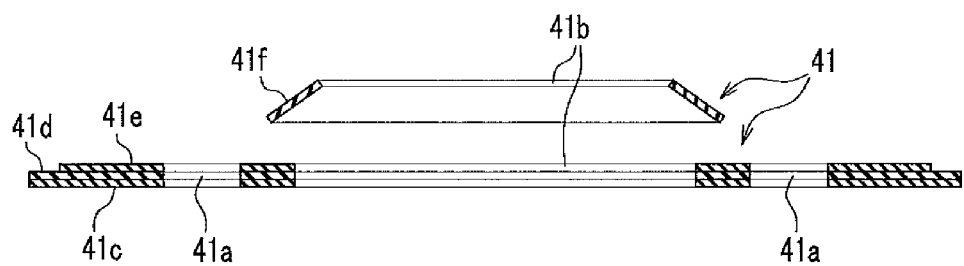
FIG. 9B is a cross sectional view of the first leaf valve along AA line shown in FIG. 9A.

FIG. 9A is an enlarged plain view showing a shape of the first leaf valve before the first leaf valve is installed to the hydraulic shock absorber. FIG. 9B is a cross sectional view of the first leaf valve along A-A line shown in FIG. 9A.

As shown in FIGS. 7 and 8, the first leaf valve 41 (valve) is a valve element which opens when the force for opening the first leaf valve 41 becomes greater than the spring force of the first leaf valve 41 by the pressure of the fluid passing through the first communication passage 4Aa from the second fluid chamber 22. The first leaf valve 41 is a check valve which allows the fluid in the second fluid chamber 22 to flow through the first communication passage 4Aa to the first fluid chamber 21 when the first leaf valve 41 is opened. The opening end of the first communication passage 4Aa on the side of the first fluid chamber 21 is a valve seat of the first leaf valve 41.

As shown in FIGS. 9A and 9B, the first leaf valve 41 is made of ring-like thin metallic plates. The ring-like thin metallic plates include a fitting hole 41b through which the valve holding member 44A is fitted and which is formed at the center of the ring-like thin metallic plate and a plurality of fluid holes 41a which is formed around the fitting hole 41b and communicates with the third communication passages 4Ab. The first leaf valve 41 are made by stacking, for example, two large diameter valve elements 41c, 41d which are formed to be plate shape and whose outer diameters are substantially the same as that of the piston 4A (see FIGS. 7 and 8), an intermediate diameter valve element 41e which is formed to be plate shape and whose diameter is smaller than that of the large diameter valve element 41c and a small diameter valve element 41f which is formed to be skirt-like shape expanding at its lower end (dish washer shape) and whose diameter is smaller than that of the intermediate diameter valve element 41e.

The intermediate diameter valve element 41e is stacked on the large diameter valve element 41c, 41d (see FIG. 9B), and the small diameter valve element 41f which has a spring property in a valve closing direction is further stacked on the intermediate diameter valve element 41e in the first leaf valve 41. The first leaf valve 41 is assembled such that the first leaf valve 41 is pressed to the valve seat surface 4Ad of the piston 4A to be flat by the swage portions 44Aa, 44Ab of the valve holding member 44A and is sandwiched by the swage portions 44Aa, 44Ab of the valve holding member 44 as shown in FIGS. 7 and 8.

Thus, the first leaf valve 41 assembled to the piston 4A has an appropriate elastic force which presses the large diameter valve elements 41c, 41d and the intermediate diameter valve element 41e to close the first communication passage 4Aa with the small diameter valve element 41f (see FIG. 9B).

The first leaf valve 41 is made by stacking the plurality of the thin metallic plates to generate an appropriate elastic force (resisting force) against the fluid flow, and thus the first leaf valve 41 has an elastic force for automatically returning itself to the valve closing direction (see FIG. 9B). Normally, the first leaf valve 41 is pressed by its elastic force to the valve seat surface 4Ad of the piston 4A to be in a valve closing state in which the first communication passage 4Aa is closed. The fluid holes 41a which are aligned with the third communication passages 4Ab to be communicated with the third communication passages 4Ab are bored in the first leaf valve 41. By swaging the swage portions 44Aa, 44Ab at both ends of the valve holding member 44A which is fitted in the piston 4A on the axial center side, the first leaf valve 41 is fixed to the top surface of the piston 4A (valve seat surface 4Ad), and the second leaf valve 42 is fixed to the bottom surface of the piston 4A.

The second leaf valve 42 (valve) is a valve element which opens to allow the fluid in the first fluid chamber 21 to flow through the third communication passage 4Ab to the second fluid chamber 22 when the force for opening the second leaf valve 42 becomes greater than the elastic force of the second leaf valve 42 by the pressure of the fluid flowing through the third communication passage 4Ab from the first fluid chamber 21. The opening end of the third communication passage 4Ab on the side of the second fluid chamber 22 is a valve seat for the second leaf valve 42. Similarly to the first leaf valve 41, the second leaf valve 42 is made by stacking a plurality of thin metallic plates having at its center part a bore into which the valve holding member 44A is fitted to generate an appropriate elastic force (resisting force) against the fluid flow.

The second leaf valve 42 is made by stacking, for example, three intermediate valve elements 42a, 42b, 42c which are formed to be flat and whose outer diameters are large enough to cover all opening ends of the third communication passages 4Ab and a small diameter valve element 42d which is formed to be skirt-like shape expanding at its lower end (dish washer shape) and whose diameter is smaller than those of the intermediate diameter valve elements 42a, 42b, 42c.

A small diameter valve element 42d which has a spring property in a valve closing direction is stacked under the intermediate valve elements 42a, 42b, 42c in the second leaf valve 42. The second leaf valve 42 is assembled such that the second leaf valve 42 is pressed to the bottom surface of the piston 4A and is elastically deformed to be flat by the swage portions 44Aa, 44Ab of the valve holding member 44A, and is sandwiched by the swage portions 44Aa, 44Ab of the valve holding member 44A.

Thus, the second leaf valve 42 assembled to the piston 4A has an appropriate elastic force for automatically returning itself in the direction for closing the third communication passages 4Ab with the small diameter valve element 42d. Normally, the second leaf valve 42 is in a valve closing state due to its elastic force.

As shown in FIGS. 7 and 8, the sliding portion 43A is formed by integrally forming a valve holding member 44A which is fitted in the through-hole 4Ac of the piston 4A and sandwiches the piston 4A, the first leaf valve 41 and the second leaf valve 42 in the axial direction of the piston 4A and a slide bush 45 which slides along the outer circumferential surface 3Ae of the piston rod 3A to function as a valve element for opening or closing the second communication passage 3Aa.

The valve holding member 44A is a member for fixing the first leaf valve 41 and the second leaf valve 42 to the piston 4A in such a manner that the first leaf valve 41 and the second leaf valve 42 are allowed to open or close the first communication passage 4Aa and the third communication passage 4Ab, respectively. The valve holding member 44A is made of a bobbin-like metallic member having the swage portions 44Aa, 44Ab at its both ends. The valve holding member 44A is fitted in the piston 4A, the first leaf valve 41 and the second leaf valve 42 from radial inside of the piston 4A, and fixes the axial center sides of the first leaf valve 41 and the second leaf valve 42 to the piston 4A by the swage portions 44Aa, 44Ab which are formed to be in a flange shape by bending the both ends of the valve holding member 44A outward.

Thus, the valve holding member 44A allows to make the length of the piston 4A shorter in its axial direction, thereby to downsize the piston 4A.

Formed on the swage portion 44Aa are communication holes 44Ac which are communicated with the third communication passages 4Ab and the fluid holes 41a of the first leaf valve 41, a control portion 44Ad for appropriately controlling the flexure degree of the first leaf valve 41 when the first leaf valve 41 is opened by the fluid pressure to adjust the fluid resistance of the liquid flowing through the first communication passage 4Aa, and a spring receiving surface 44Ae for supporting the lower end of the energizing unit 51A.

Formed on the swage portion 44Ab on the lower end is a control portion 44Af which appropriately controls the flexure degree of the second leaf valve 42 when the second leaf valve 42 is opened by the fluid pressure to adjust the fluid resistance of the fluid flowing through the third communication passage 4Ab. The control portion 44Af is disposed at the lower opening ends of the third communication passages 4Ab with some space between the control portion 44Af and the opening ends of the third communication passages 4Ab.

The slide bush 45 is a cylindrical member which is internally fitted in the valve holding member 44A and functions as a sliding member which has an inner peripheral surface being into contact with and sliding along the outer circumferential surface 3Ae of the piston rod 3A. The slide bush 45 is formed, for example, of a material which has a low sliding resistance and a good slidability, such as tetrafluoroethylene resin. The slide bush 45 is interposed between the valve holding member 44A which moves together with the piston 4A and the smaller diameter portion 3Ac of the piston rod 3A so as to reduce the sliding resistance generated therebetween. The slide bush 45 also functions as a valve element which changes the opening degree of the openings 3Ag, 3Ah of the second communication passage 3Aa to open or close the openings 3Ag, 3Ah by moving up or down relative to the piston 4A. The valve holding member 44A and the slide bush 45 may be formed by one member.

The piston ring 46 is a cylinder-like member fixed to the outer circumferential surface of the piston 4A and slides along the inner peripheral surface of the cylinder 2A. The piston ring 46 is a member for keeping airtightness and reducing the friction resistance when the piston 4A slides vertically in the cylinder 2A due to a vibration of a vehicle.

As shown in FIGS. 7 and 8, the piston movement adjusting unit 5A is a system for controlling the movement of the piston 4A according to the movement speed of the piston rod 3A to smoothly change a damping force. The piston movement adjusting unit 5A includes the energizing unit 51A, the piston 4A including the first leaf valve 41, the first communication passage 4Aa and the sliding portion 43A, and the piston rod 3A including the second communication passage 3Aa and the smaller diameter portion 3Ac. The piston movement adjusting unit 5A is arranged between the first fluid chamber 21 and the second fluid chamber 22.

The piston movement adjusting unit 5A enables to control the communicating state of the second communication passage 3Aa which communicates the first fluid chamber 21 with the second fluid chamber 22 based on the sliding state of the piston 4A. The piston movement adjusting unit 5A allows the piston 4 to slide against the energizing force of the energizing unit 51A according to the movement speed of the piston rod 3A, whereby the piston movement adjusting unit 5A enables to control the areas of the openings 3Ag, 3Ah of the second communication passage 3Aa which face to the first fluid chamber 21 and the second fluid chamber 22, respectively.

As shown in FIGS. 7 and 8, the energizing unit 51A is an elastic member pressing the piston 4A in the direction opposite to the sliding direction of the piston 4A in the axial direction of the piston rod 3A. The energizing unit 51A is made of a cylindrical coil spring for example. The energizing unit 51A is loosely fitted to the smaller diameter portion 3Ac of the piston rod 3A. The upper end of the energizing unit 51A presses the spring sheet 6A which is engaged with the step portion 3Ab of the piston rod 3A upward with its spring force. The lower end of the energizing unit 51A presses the upper side of the swage portion 44Aa of the valve holding member 44A downward. Since the energizing unit 51A is interposed between the spring sheet 6A disposed on the upper side of the piston 4A and the valve holding member 44A in a compressed state, the energizing unit 51A is allowed to change a damping force which is generated when input load is applied to the piston rod 3A in the direction for compressing the energizing unit 51A.

The spring sheet 6A is a spring receiver which supports the upper end of the energizing unit 51A and is formed of a disk-like metallic material which is externally fitted to the piston rod 3A in such a manner that the spring sheet 6A comes in contact with the smaller diameter portion 3Ac and the step portion 3Ab. The spring sheet 6A is comprised of a cylindrical part 6Aa which is slidably fitted to the smaller diameter portion 3Ac and a flange part 6Ab which comes in contact with the step portion 3Ab and receives the upper end of the energizing unit 51A.

The nut 7 is a member for sandwiching the spring sheet 6A, the energizing unit 51A and the piston 4A which are movably fitted to the smaller diameter portion 3Ac with the step portion 3Ab. The nut 7 functions as a stopper for restraining the downward movement of the piston 4 which functions as a valve for opening or closing the opening 3Ag of the second communication passage 3Aa. The nut 7 is a fastener member which is engaged with the male screw portion 3Ad of the piston rod 3A.

Effect of the Hydraulic Shock Absorber 1A of the Second Embodiment

Next, the assembly and the effect of the hydraulic shock absorber 1A according to the second embodiment of the present invention are described with reference to FIGS. 7 and 8.

As shown in FIGS. 7 and 8, when assembling the hydraulic shock absorber 1A, the slide bush 45 is internally fitted to the valve holding member 44A and the swage portion 44Aa on its upper side is bent to be in a flange shape in advance. The first leaf valve, the piston 4A which is integrally formed with the piston ring 46, and the second leaf valve 42 are fitted to the valve holding member 44A from its bottom side in this order, and then swage portion 44Ab on the bottom side is swaged. Thus, the first leaf valve 41 is fixed on the top surface of the piston 4A and the second leaf valve 42 is fixed on the bottom surface of the piston 4A.

The spring sheet 6A, the energizing unit 51A and the piston 4A is externally fitted to the smaller diameter portion 3Ac of the piston rod 3A from the bottom end of the piston rod 3A in this order. The female screw portion of the nut 7 is then engaged with the male screw portion 3Ad of the piston rod 3A. Thus, the assembly of the piston part of the hydraulic shock absorber 1A is completed.

Since the hydraulic shock absorber 1A is assembled such that each component, such as the piston 4A, is fitted to the piston rod 3A in the same axial direction and is fastened with one nut 7 as described above, it is easy to automatically assemble the hydraulic shock absorber 1A by using an automatic assembling machine.

Furthermore, it is also possible to reduce the number of components and assembling man-hours and to shorten the length of the piston 4A in its axial direction since a piston member for the hydraulic shock absorber 1A is comprised of only one piston 4A. Moreover, the length of the piston 4A in its axial direction can be made shorter since the first leaf valve 41 and the second leaf valve 42 are fixed by the swage portions 44Aa, 44Ab of the valve holding member 44A which is formed by bending a plate-shape metallic member.

Operation of the Hydraulic Shock Absorber 1A of the Second Embodiment

Next, the operation of the hydraulic shock absorber 1A according to the second embodiment of the present invention is explained with reference to FIGS. 10A to 12 with an example in which the hydraulic shock absorber 1A is compressed.

Figure 11:
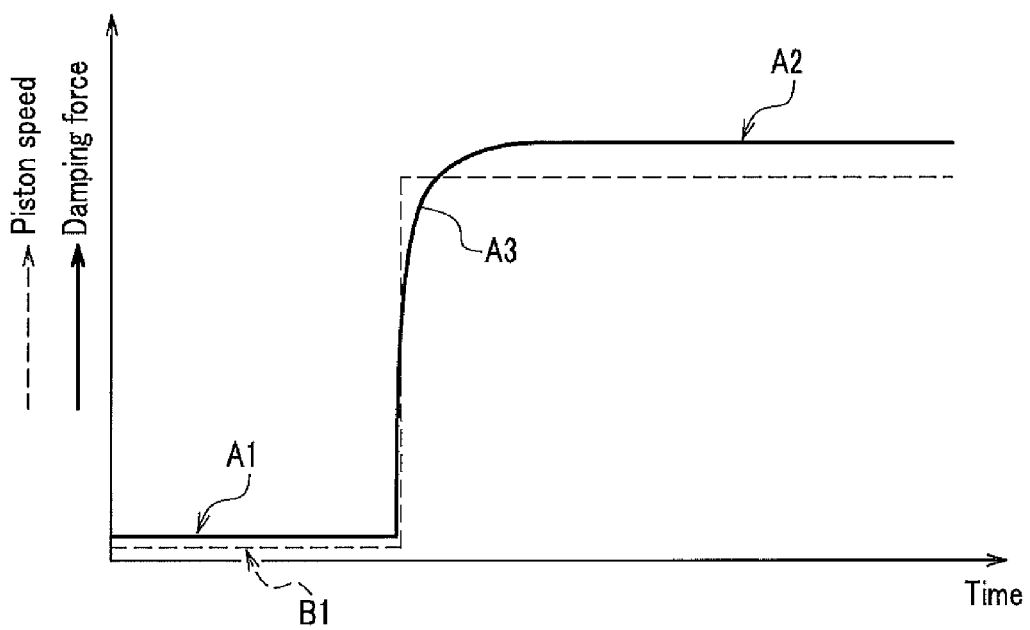
FIG. 11 is a graph showing time relationships of the damping force and the piston speed of the hydraulic shock absorber of the second embodiment.
Figure 12:
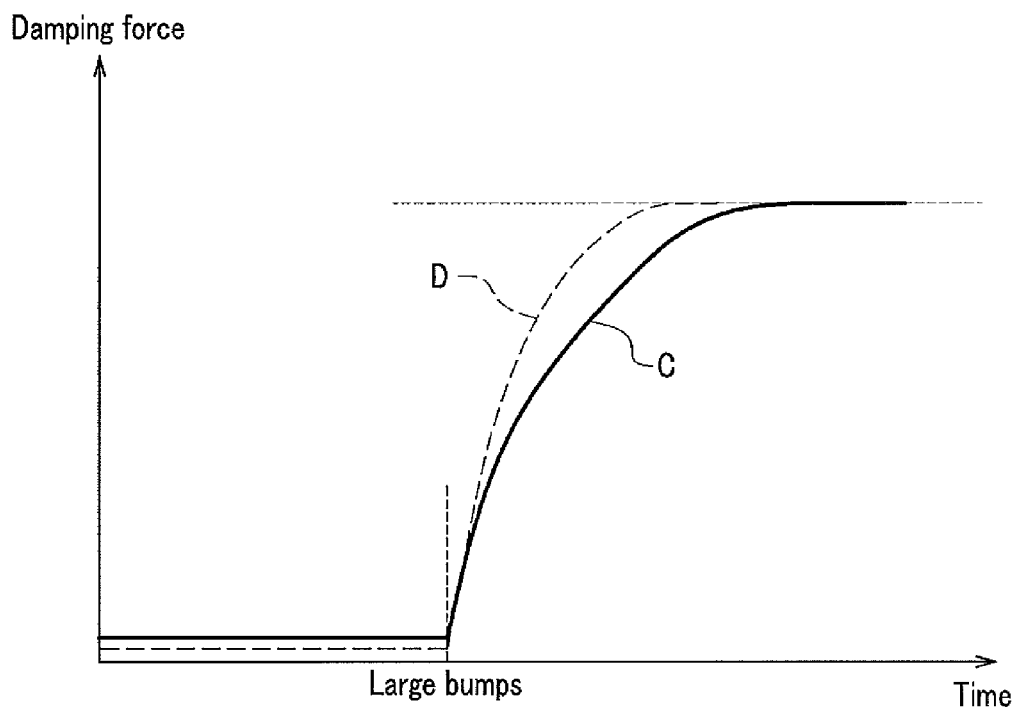
FIG. 12 is a graph showing a relationship of a damping force of the hydraulic shock absorber according to the second embodiment and time.

FIGS. 10A and 10B are illustrations for showing the operation of the hydraulic shock absorber according to the second embodiment of the present invention. FIG. 10A is an enlarged cross-sectional view showing a main part of the hydraulic shock absorber in a state where input load to the piston rod is small. FIG. 10B is an enlarged cross-sectional view showing a main part of the hydraulic shock absorber in a state where input load to the piston rod is large. FIG. 11 is a graph showing the temporal relationship of the damping force and the piston speed of the hydraulic shock absorber according to the second embodiment of the present invention. FIG. 12 is a graph showing the relationship between the damping force of the hydraulic shock absorber according to the second embodiment of the present invention and time.

Firstly, the operation of the hydraulic shock absorber 1A in a state where downward input load to the piston rod 3A (movement acceleration) is small is described with reference to FIGS. 10A and 11.

As shown in FIG. 10A, if the downward input load to the piston rod 3A is small, the pressing force of the piston rod 3A for compressing the energizing unit 51A via the spring sheet 6A is small. Thus, the pressing force does not reach a valve opening point at which the energizing unit 51A is compressed to open the opening 3Ag of the second communication passage 3Aa of the piston movement adjusting unit 5A.

The pressing force (reaction force) of the fluid in the second fluid chamber 22 for pressing the piston 4A upward is also small, and thus, the piston 4A does not move relative to the piston rod 3A, whereby the opening 3Ag of the second communication passage 3Aa on the side of the first fluid chamber 21 remains closed.

Thus, the piston 4A moves down a little together with the piston rod 3A, pressing the fluid in the second fluid chamber 22. The reaction force of the fluid in the second fluid chamber 22 is also small according to the movement amount of the piston 4A, weakly pressing the first leaf valve 41 upward to open the first leaf valve 41. The first leaf valve 41 is pressed and opened by the reaction force of the fluid in the second fluid chamber 22. The fluid in the second fluid chamber 22 presses the first leaf valve 41 upward against the elastic force of the first leaf valve 41 for closing the valve to bend the first leaf valve 41, whereby the first leaf valve 41 is opened and the fluid in the second fluid chamber 22 flows to the first fluid chamber 21.

Thus, a small damping force according to the input load to the piston rod 3A is generated in the hydraulic shock absorber 1A by the fluid passage resistance against the fluid flowing through the first leaf valve 41 as shown in the damping force characteristic curve A1 in FIG. 11. In this case, the opening area (opening degree) of the valve seat part of the first leaf valve 41 is regulated by the control portion 44Af to be small, which makes the fluid flow amount to be also small. Thus, it takes time for the fluid in the second fluid chamber 22 on the lower side of the piston 4A to flow to the first fluid chamber 21 on the upper side of the piston 4A, which makes the piston speed of the piston 4A to be lower due to the flow resistance of the fluid as shown in the piston speed characteristic curve B1 in FIG. 11.

Next, the operation of the hydraulic shock absorber 1A is described with reference to FIGS. 10B and 11 in a case where the input load (moving speed) of the piston rod 3A of the hydraulic shock absorber 1A is large enough to reach a valve opening point at which the opening 3Ag of the second communication passage 3Aa in the piston movement adjusting unit 5A is opened.

If the input load to the piston rod 3A in the downward direction is large as shown in FIG. 10B, the piston rod 3A and the spring sheet 6A move downward, pressing the piston 4A downward via the energizing unit 51A. This makes the pressing force (reaction force) of the fluid in the second fluid chamber 22 for pressing the piston 4A upward to be larger. When the reaction force of the fluid of the second fluid chamber 22 for pressing the piston 4A upward biomes larger than the spring force of the energizing unit 51A, the energizing unit 51A is compressed and the piston 4A moves upward relative to the piston rod 3A.

Thus, the energizing unit 51A of the piston movement adjusting unit 5A is compressed in accordance with the sliding amount of the piston 4A which slides in a direction opposite to the moving direction of the piston rod 3A, and the energizing force of the energizing unit 51A is continuously varied (see the damping force characteristic curves A1, A2 in FIG. 11). This makes a driver to feel a seat is less hard at the time when a damping force characteristic is changed, which allows to improve ride quality of a vehicle.

At this time, the first leaf valve 41 is bent by the fluid flowing through the first communication passage 4Aa so that the first leaf valve 41 remains to be opened. Further, the pressing force (reaction force) of the fluid in the second fluid chamber 22 in the upward direction moves the piston 4A upward relative to the piston rod 3A against the energizing unit 51A.

Thus, the piston 4A is separated from the nut 7, and the slide bush 45 which has closed the opening 3Ag on the lower side of the second communication passage 3Aa opens the opening 3Ag, allowing the fluid in the second fluid chamber 22 to flow to the first fluid chamber 21 through the second communication passage 3Aa.

It is to be noted that the piston speed of the piston 4A becomes lower relative to the moving speed of the piston rod 3A by the sliding amount of the piston 4A relative to the piston rod 3A.

When the piston 4A slides upward by the reaction force of the fluid, the fluid in the second fluid chamber 22 also flows through the second communication passage 3Aa to the first fluid chamber 21, which makes the amount of the fluid flowing upward through the first communication passage 4Aa in the piston 4A to be decreased instantaneously. At this time, the piston speed becomes lower relative to the moving speed of the piston rod 3A. Thus, it is possible to enhance the ride quality of a vehicle because a rise of a damping force is changed smoothly as shown by the gentle curve of the damping force characteristic curve A3 in FIG. 11.

In a case where an input load larger than a predetermined value (a valve opening point at which the energizing unit 51A is compressed enough to open the opening 3Ag) is input when a vehicle rides over a rough area on a road and the piston 4A is slid by this input load, the flow amount of the fluid passing through the first communication passage 4Aa can be decreased instantaneously by allowing the fluid to flow through the second communication passage 3Aa. This makes it possible to decrease the sliding speed of the piston 4A relative to the piston rod 3A, whereby a rise of the damping force can be made gentle. Thus, it is possible to prevent the piston speed and the damping force from rising sharply when a vehicle rides over a rough area on a road which is not in a good condition, whereby the riding quality can be enhanced.

As described above, the hydraulic shock absorber 1A allows to decrease the inclination of the rise of the damping force with the piston movement adjusting unit 5A which opens the second communication passage 3Aa depending on the sliding state of the piston 4A to adjust the communication state between the first fluid chamber 21 and the second fluid chamber 22 when a vehicle rides over a rough area on a road and a large load is input. Thus, the damping force characteristic curve C shows a gentle curve of a damping force without a step as shown in FIG. 12, compared with the damping force characteristic curve D of the conventional shock absorber disclosed in Japanese Patent Application Publication No. 9-291961, which allows to reduce a step feeling.

The hydraulic shock absorber 1A is provided with the energizing unit 51A which energize the piston 4A in its axial direction for regulating the movement of the piston 4A. The positional relationship between the piston 4A and the piston rod 3A, or the positional relationship between the piston 4A and the opening 3Ag is determined based on expansion and contraction amounts of the energizing unit 51A. Thus, it is possible to control the flow amount of the fluid passing through the opening 3Ag, a flow resistance and a piston movement amount by adjusting the area (opening degree) of the opening 3Ag of the second communication passage 3Aa which faces to the second fluid chamber 22.

As a result, the variation of the damping force of the hydraulic shock absorber 1A can be made gentle, which prevents a driver from feeling "hard" and offers a comfortable driving.

The operation of the hydraulic shock absorber 1A has been explained with an example where the piston rod 3A is retracted as above. If the piston rod 3A is extended, the second leaf valve 42 is opened to adjust the damping force.

Modification of Second Embodiment

Figure 13A:
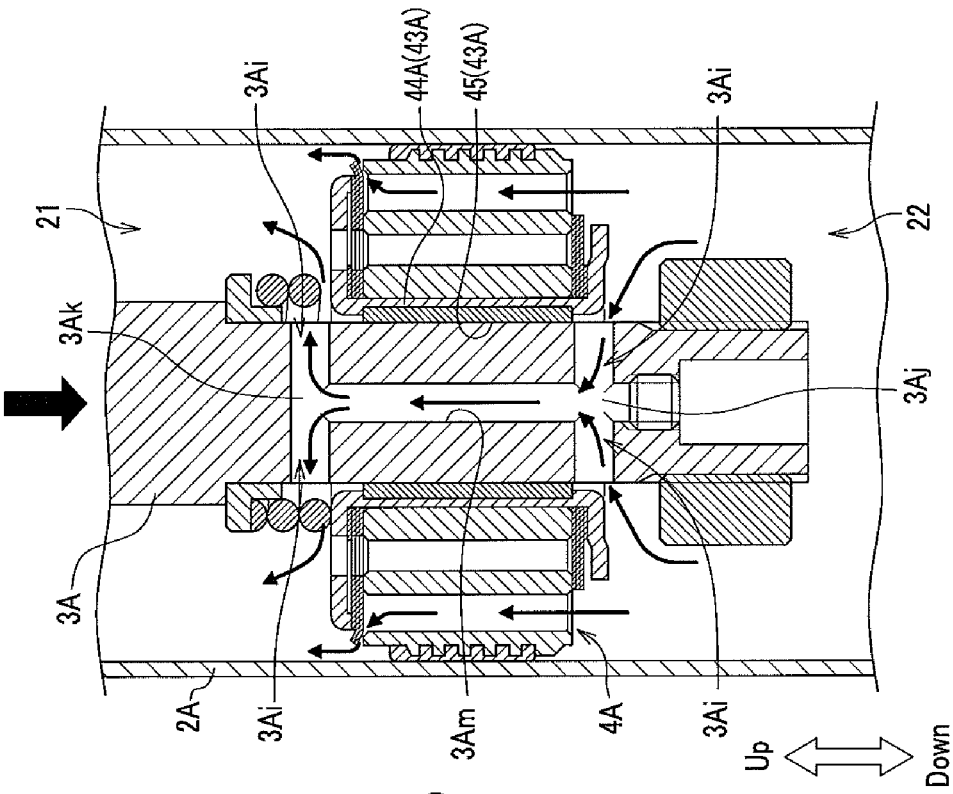
FIG. 13A is an enlarged cross sectional view of an essential part of a hydraulic shock absorber of a modification of the second embodiment showing its operation when an input load applied to the piston rod is small.
Figure 13B:
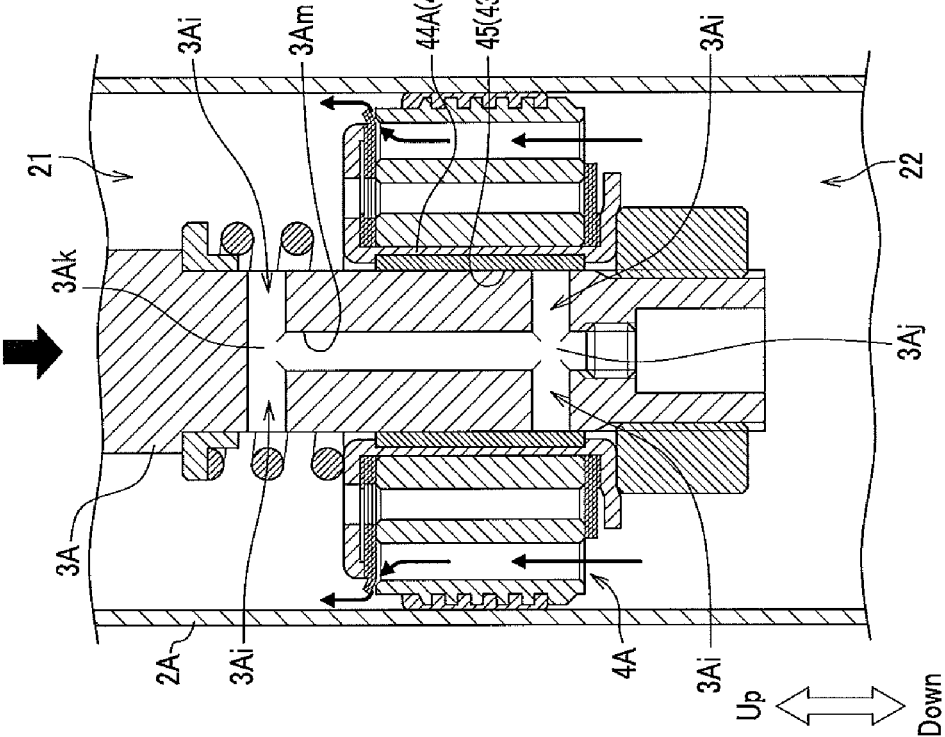
FIG. 13B is an enlarged cross sectional view of the essential part of the hydraulic shock absorber of the modification of the second embodiment showing its operation when an input load applied to the piston rod is large.

FIGS. 13A and 13B are illustrations showing operations of a hydraulic shock absorber according to a modification of the second embodiment of the present invention. FIG. 13A is an enlarged cross sectional view showing a main part of the hydraulic shock absorber in a case where an input load to the piston rod is small. FIG. 13B is an enlarged cross sectional view showing a main part of the hydraulic shock absorber in a case where an input load to the piston rod is large.

In the second embodiment, as an example of the second communication passage 3Aa which is formed on the piston rod 3A, groove like second communication passages 3Aa are described which are provided on the outer circumferential surface 3Ae of the smaller diameter portion 3Ac of the piston rod 3A as shown in FIGS. 7 and 8, however, the second communication passage 3Aa is not limited to these groove like second communication passages 3Aa.

As shown in FIGS. 13A and 13B, a second communication passage 3Ai may be formed to be substantially I-shape in cross section in the piston rod 3A in such a manner that a side-cave like opening 3Aj on the lower side and a side-cave like opening 3Ak on the upper side are communicated with each other through a vertical hole-like communication hole 3Am. In short, the second communication passage 3Ai may be bored through the piston rod 3A as long as the second communication passage 3Ai includes the opening 3Aj on the lower side and the opening 3Ak on the upper side.

In this case, the opening 3Aj on the lower side is closed by the slide bush 45 of the sliding portion 43A of the piston 4 when an input load to the piston rod 3A is small or the shock absorber is in an normal condition as shown in FIG. 13A, and is opened when the input load to the piston rod 3A is large as shown in FIG. 13B.

The shape or material of the first leaf valve 41 and the second leaf valve 42 shown in FIG. 7 are not limited to those described before as long as they have appropriate elasticity for pressing and closing the first communication passages 4Aa and the third communication passages 4Ab, respectively.

Third Embodiment

Next, a hydraulic shock absorber 1B according to a third embodiment of the present invention is described with reference to FIGS. 14 to 18. Components of the third embodiment corresponding to those of the first and second embodiments are assigned similar reference numerals, and descriptions thereof are omitted.

Figure 14:
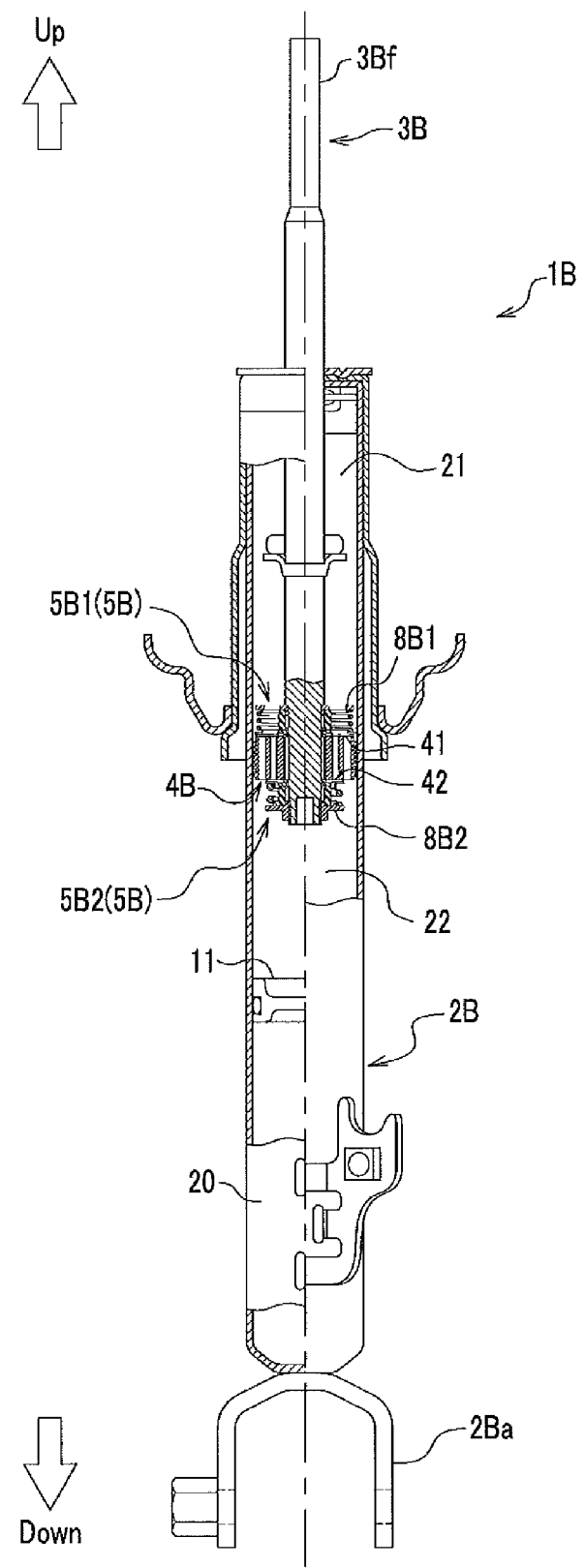
FIG. 14 is a cross sectional view of a hydraulic shock absorber according to a third embodiment of the present invention.

The hydraulic shock absorber 1B of the third embodiment shown in FIG. 14 is a vehicle suspension system in which a piston 4B is arranged at the lower end of a piston rod 3B such that the piston 4B is elastically movable along the piston rod 3B in up-down direction. The hydraulic shock absorber 1B is also provided with valve controlling units 5B (a first valve controlling unit 5B1 and a second valve controlling unit 5B2) for controlling the openings of the first leaf valve 41 and the second leaf valve 42.

Figure 15:
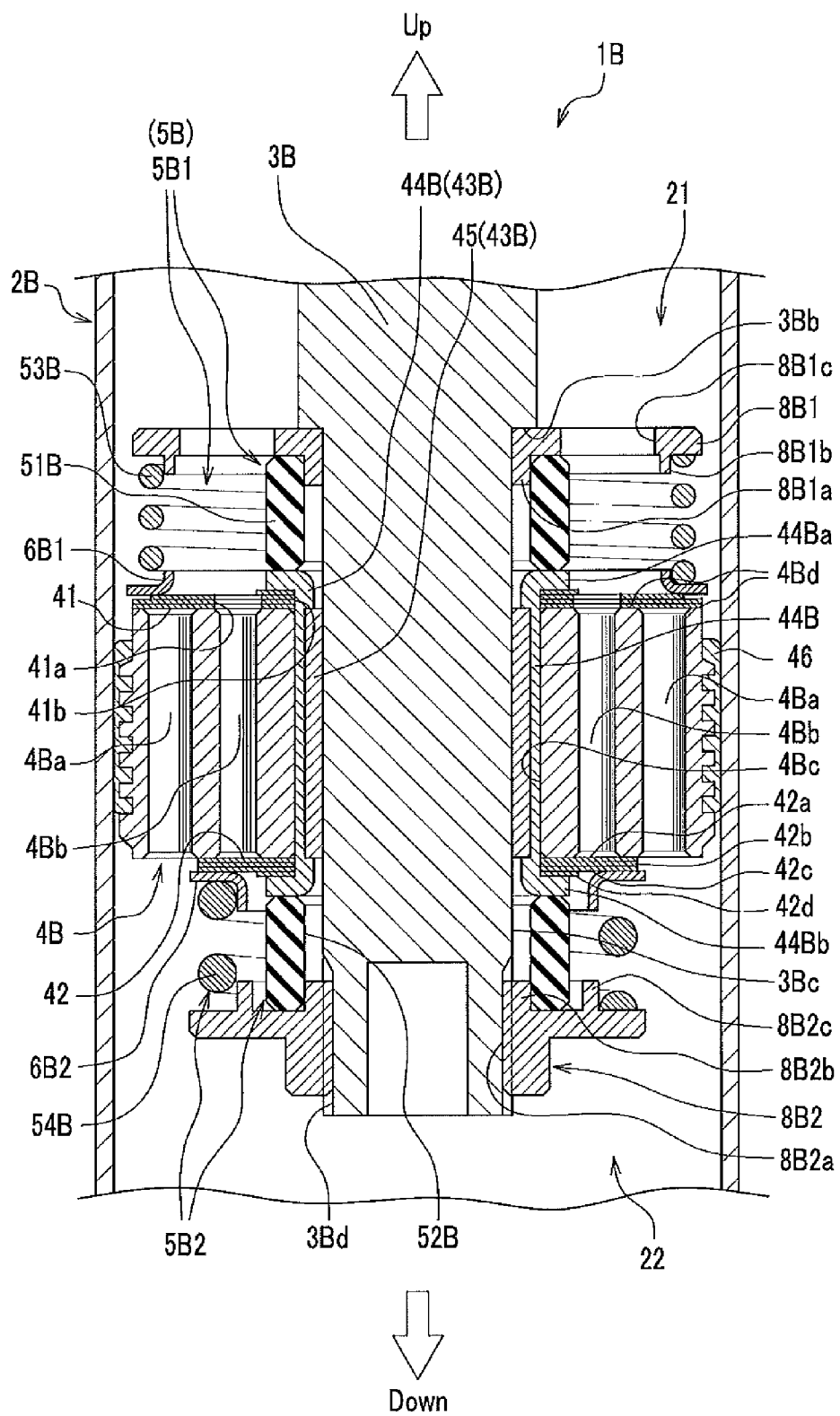
FIG. 15 is an enlarged cross sectional view of an essential part of the hydraulic shock absorber according to the third embodiment.
Figure 16:
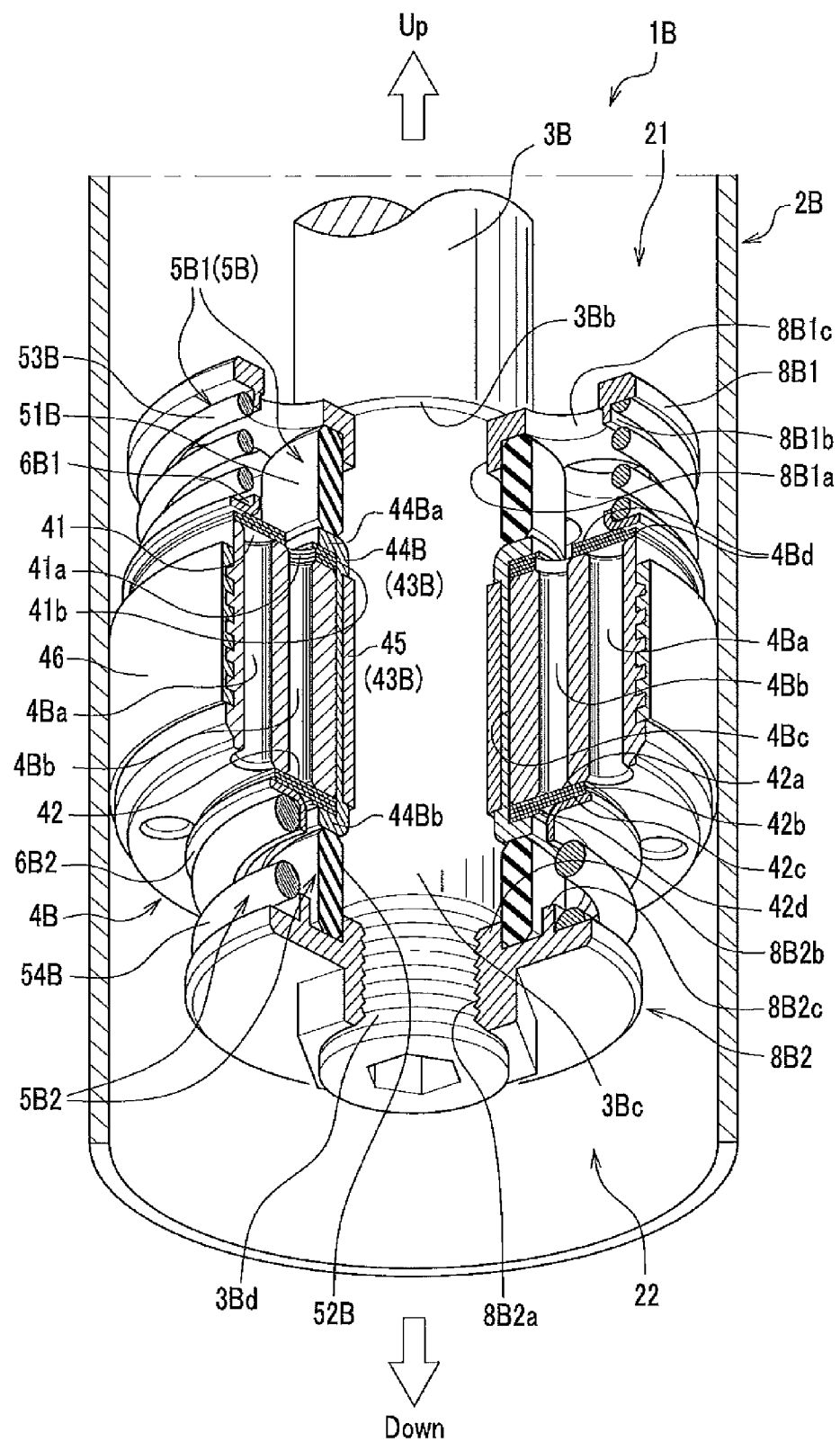
FIG. 16 is an enlarged perspective view of the essential part of the hydraulic shock absorber according to the third embodiment showing a cross-section of a part of the essential part.

As shown in FIGS. 15 and 16, the hydraulic shock absorber 1B includes a cylinder 2B, the piston rod 3B, the piston 4B, first communication passages 4Ba, third communication passages 4Bb, the first leaf valve 41, the second leaf valve 42, a sliding portion 43B, a valve holding member 44B, valve controlling unit 5B, a first rubber 51B, a second rubber 51B, a first spring 53B, a second spring 54B, a first supporting disk 8B1, a second supporting disk 8B2, a first spring seat 6B1 and a second spring seat 6B2.

Formed at the lower end of the piston rod 3B are a step portion 3Bb with which the first supporting disk 8B1 comes in contact with, a smaller diameter portion 3Bc to which the first supporting disk 8B1 and the slide bush 45 are externally fitted, and a male screw portion 3Bd with which a female screw portion 8B2a formed on the second supporting disk 8B2 is engaged. It is to be noted that the grooves 3a of the first embodiment are not formed on the piston rod 3B.

As shown in FIGS. 15 and 16, the piston 4B includes a plurality of first communication passages 4Ba, a plurality of third communication passages 4Bb, a through-hole 4Bc bored through the piston 4B at its center part and a bypass passage (not shown). The piston 4B is provided with the first leaf valve 41 which is provided on the side of the first fluid chamber 21 for opening or closing the first communication passages 4Ba, the second leaf valve 42 which is provided on the side of the second fluid chamber 22 for opening or closing the third communication passages 4Bb, the sliding portion 43B which is internally fitted to the through-hole 4Bc, and the piston ring 46 which is externally fitted to its outer circumferential surface.

The piston 4B has a function to damp an input load when the wheel is bound with an orifice effect generated when the fluid in the second fluid chamber 22 is pressed by the piston 4B to flow through the first communication passage 4Ba to the first fluid chamber 21 and elastic force of the first valve controlling unit 5B1 which is compressed. The piston 4B also has a function to damp an input load when the wheel is rebound with an orifice effect generated when the fluid in the first fluid chamber 21 is pressed by the piston 4B to flow through the first communication passage 4Ba to the second fluid chamber 22 and elastic force of the first valve controlling unit 5B2 which is compressed.

The piston 4B is movably fitted to the smaller diameter portion 3Bc of the piston rod 3B in the axial direction of the piston rod 3B with the valve holding member 44B and the slide bush 45 being interposed between the piston rod 4B and the smaller diameter portion 3Bc. The up and down movement of the piston 4B is regulated between the first supporting disk 8B1 which is engaged with the step portion 3Bb formed at the upper end of the smaller diameter portion 3Bc and a second supporting disk 8B2 which is fixed at the lower end of the smaller diameter portion 3Bc such that the top surface of the piston 4B which faces to the first fluid chamber 21 is always pressed by the first rubber 51B and the first spring 53B and the bottom surface of the piston 4B which faces to the second fluid chamber 22 is always pressed by the second rubber 51B and the second spring 54B.

Similarly to the first communication passage 4Aa of the second embodiment, the upper side opening of the first communication passage 4Ba (communication passage) is opened or closed by the first leaf valve 41. Similarly to the third communication passage 4Ab of the second embodiment, the lower side opening of the third communication passage 4Bb (communication passage) is opened or closed by the second leaf valve 42.

The bypass passage (not shown) is a passage through which the fluid flows between the first fluid chamber 21 and the second fluid chamber 22, which are partitioned by the piston 4B, when the piston 4B moves even if the first leaf valve 41 and the second leaf valve 42 are closed. The bypass passage is formed, for example, of a passage bored through the piston 4B or a space between the piston 4B and the wall surface of the cylinder 2B. The damping force of the hydraulic shock absorber 1B is changed according to the piston speed with this bypass passage since the fluid flows between the first fluid chamber 21 and the second fluid chamber 22 through the bypass passage even if the first leaf valve 41 and the second leaf valve 42 are closed until the piston speed reaches predetermined speeds (i.e. valve opening points P1 and P2) (see FIG. 18).

The first leaf valve 41 (valve) and the second leaf valve 42 (valve) shown in FIGS. 14 and 15 are the same as those described in the first embodiment shown in FIGS. 9A and 9B. The first leaf valve 41 is a valve element which opens when a force in the direction for opening the first leaf valve 41 becomes larger against the spring force (second energizing force) of the first spring 53B (second elastic unit) pressing the first leaf valve 41 by the pressure of the fluid flowing through the first communication passage 4Ba from the second fluid chamber 22. The first leaf valve 41 is a check valve which allows the fluid in the second fluid chamber 22 to flow through the first communication passage 4Ba to the first fluid chamber 21 when the first leaf valve 41 is opened.

The first leaf valve 41 is formed in such a manner that the intermediate diameter valve element 41e is stacked on the large diameter valve elements 41c, 41d (see FIG. 9B), and the small diameter valve element 41f which has a spring property in a valve closing direction is further stacked on the intermediate diameter valve element 41e (see FIGS. 9A and 9B). The first leaf valve 41 is assembled such that the swage portions 44Ba, 44Bb of the valve holding member 44B press the first valve 41 to the valve seat surface 4Bd of the piston 4B flat. The portion of the upper surface of the first leaf valve 41 on its outer peripheral side is always pressed by the first spring seat 6B1 which is energized by the spring force of the first spring 53B, and the first leaf valve 41 is closed.

The second leaf valve 42 is a valve element which opens when a force in the direction for opening the second leaf valve 42 becomes larger against the spring force of the second spring 53B by the pressure of the fluid flowing through the third communication passage 4Bb from the first fluid chamber 21. The second leaf valve 42 is a check valve which allows the fluid in the first fluid chamber 21 to flow through the third communication passage 4Bb to the second fluid chamber 22 when the second leaf valve 42 is opened (not shown). The second leaf valve 42 is formed in such a manner that the small diameter valve element 41f which has a spring property in a valve closing direction is stacked below the intermediate diameter valve elements 42a, 42b, 42c. The second leaf valve 42 is assembled such that the swage portions 44Ba, 44Bb of the valve holding member 44B press the second leaf valve 41 to the bottom surface of the piston 4B flat. A portion of the lower surface of the second leaf valve 42 on its outer peripheral side is always pressed by the second spring seat 6B2 which is energized by the spring force of the second spring 54B.

As shown in FIGS. 15 and 16, the sliding portion 43B is comprised of a valve holding member 44B which is internally fitted to the through-hole 4Bc of the piston 4B for sandwiching the piston 4B, the first leaf valve 41 and the second leaf valve 42, and the slide bush 45 which is the same as that used in the second embodiment.

The valve holding member 44B is a member for fixing the first leaf valve 41 and the second leaf valve 42 to the piston 4B such that the first leaf valve 41 and the second leaf valve 42 can open or close the first communication passage 4Ba and the third communication passage 4Bb, respectively. The valve holding member 44B is formed of a metallic cylinder having the swage portions 44Ba, 44Bb at its both ends.

The valve holding member 44B is fitted in the piston 4A, the first leaf valve 41 and the second leaf valve 42 from radial inside of the piston 4A, the first leaf valve 41 and the second leaf valve 42, and fixes the first leaf valve 41 and the second leaf valve 42 by the swage portions 44Ba, 44Bb which are formed to be in a flange shape by bending the both ends of the valve holding member 44B outward. The piston ring 46 has the same shape as that used in the second embodiment.

As shown in FIGS. 15 and 16, the valve controlling unit 5B is a system for controlling the opening and closing states of the first leaf valve 41 and the second leaf valve 42 according to the piston speed of the piston 4B to continuously change a damping force. The valve controlling unit 5B includes a first valve controlling unit 5B1 for controlling the opening and closing state of the first leaf valve 41 and a second valve controlling unit 5B2 for controlling opening and closing of the second leaf valve 42.

In the valve controlling unit 5B, if the piston speed of the piston 4B is below predetermined speeds S1, S2 (i.e. valve opening points P1, P2) (see FIG. 18), the spring forces (second energizing force) of the first springs 53B, 54B are larger than the elastic forces (first energizing force) of the first rubber 51B and the second rubber 52B so that the first leaf valve 41 and the second leaf valve 42 close the first communication passage 4Ba and the third communication passage 4Bb, respectively.

If the piston speed of the piston 4B is greater than the predetermined speeds S1, S2 (i.e. valve opening points P1, P2) (see FIG. 18), the second energizing force is lower than the first energizing force, whereby the first leaf valve 41 and the second leaf valve 42 open the first communication passage 4Ba and the third communication passage 4Bb, respectively.

The first valve controlling unit 5B1 includes the first rubber 51B, the first spring 53B, the first leaf valve 41, the first communication passage 4Ba, the first supporting disk 8B1 and the first spring seat 6B1. The first valve controlling unit 5B1 is arranged on the piston 4B on the side of the first fluid chamber 21.

The second valve controlling unit 5B2 includes the second rubber 51B, the second spring 54B, the second leaf valve 42, the third communication passage 4Bb, the second supporting disk 8B2 and the second spring seat 6B2. The second valve controlling unit 5B2 is arranged on the piston 4B on the side of the second fluid chamber 22.

The first rubber 51B (first elastic unit) and the second rubber 51B are elastic members which press, when the piston 4B slides, the piston 4B in the direction opposite to the sliding direction of the piston 4B with the first energizing force which continuously changes according to the sliding amount of the piston 4B sliding against the movement of the piston rod 3B.

The opening and closing state of the first leaf valve 41 and the second leaf valve 42 is determined by a pressure balance between a pressure for opening the first leaf valve 41 or the second leaf valve 42 against a pressure (second energizing force) for closing the first leaf valve 41 or the second leaf valve 42 and a pressure for moving the piston 4B against the pressure (first and second energizing force) for pressing the piston 4B, the first leaf valve 41 and the second leaf valve 42, regardless of the difference of the spring constants between the first rubber 51B and the second rubber 51B and between the first spring 53B and the second spring 54B.

Thus, in the hydraulic shock absorber 1B, not only a damping force is continuously changed according to the elastic forces (first energizing force) of the first rubber 51B or the second rubber 51B and the spring force (second energizing force) of the first spring 53B or the second spring 54B, but also the damping force is continuously changed according to the piston speed of the piston 4B when the magnitude relationship of the elastic force (first energizing force) of the first rubber 51B or the second rubber 51B and the spring force (second energizing force) of the first spring 53B or the second spring 54B is changed.

The first rubber 51B is comprised of a cylindrical elastic rubber member which is arranged on the axial center side of the piston 4B between the first supporting disk 8B1 and the swage portion 44Ba of the valve holding member 44B on the side of the first fluid chamber 21. The upper end portion of the first rubber 51B is supported by the outer side of the inner cylinder portion 8B1a of the first supporting disk 8B1, and presses the first supporting disk 8B1 upward to the step portion 3Bb with its elastic force. The lower end portion of the first rubber 51B presses the upper surface of the valve holding member 44B downward with its elastic force.

The second rubber 52B is comprised of a cylindrical elastic rubber member which is arranged close to the piston rod 3B between the valve holding member 44B and the second supporting disk on the side of the second fluid chamber 22. The second rubber 51B is formed, for example, of the same member as the first rubber 51B. The lower end portion of the second rubber 52B is supported by the outer side of the inner cylinder portion 8B2b of the second supporting disk 8B2, and presses the second supporting disk 8B2 downward with its elastic force. The upper end portion of the second rubber 52B presses the lower surface of the valve holding member 44B upward with its elastic force.

The first spring 53B (the second elastic unit) and the second spring 54B are cylindrical valve springs which press the first leaf valve 41 and the second leaf valve 42 according to their energizing forces which are continuously changed according to the sliding amount of the piston 4B in the same directions as those of the elastic forces (first energizing force) of the first rubber 51B and the second rubber 51B, respectively. The first spring 53B and the second spring 54B (the second elastic unit) are formed, for example, of a cylindrical coil spring.

As shown in FIGS. 15 and 16, the first spring 53B is arranged parallel to the first rubber 51B on the outer peripheral side of the first rubber 51B with a space between the first spring 53B and the first rubber 51B. More specifically, in the hydraulic shock absorber 1B, the first spring 53B and the first rubber 51B are arranged doubly in the axial center direction with some space therebetween. The first spring 53B is arranged such that the upper end of the first spring 53B is supported by the outer side surface of an outer cylinder portion 8B1b of the first supporting disk 8B1 and presses the first supporting disk 8B1 upward with its spring force, and the lower end of the first spring 53B presses the first leaf valve 41 to the piston 4B via the first spring seat 6B1. More specifically, the first spring 53B is interposed between the first supporting disk 8B1 and the first spring seat 6B1 in a compressed state and is guided with its upper end being supported by the outer cylinder portion 8B1b and its lower end being supported by the first spring seat 6B1 so as not to be buckled when the spring expands or contracts.

The second spring 54B is arranged parallel to the second rubber 52B on the outer peripheral side of the second rubber 52B with a space between the second spring 54B and the second rubber 52B. More specifically, in the hydraulic shock absorber 1B, the second spring 54B and the second rubber 52B are arranged doubly in the axial center direction with some space therebetween. The second spring 54B is arranged such that the lower end of the second spring 54B is supported by the outer side surface of the outer cylinder portion 8B2c of the second supporting disk 8B2 and presses the second supporting disk 8B2 downward with its spring force, and the upper end of the second spring 54B presses the second leaf valve 42 to the piston 4B via the second spring seat 6B2.

The first supporting disk 8B1 is a member for supporting the upper ends of the first rubber 51B and the first spring 53B. The first supporting disk 8B1 is comprised of a disk-like member which is externally fitted to the smaller diameter portion 3Bc of the piston rod 3B such that the disk-like member is in contact with the smaller diameter portion 3Bc and the step portion 3Bb. The first supporting disk 8B1 includes the inner cylinder portion 8B1a, the outer cylinder portion 8B1b and a plurality of communication holes 8B1c for allowing the fluid to flow easily.

The second supporting disk 8B2 is a disk-like member for supporting the lower ends of the second rubber 52B and the second spring 54B. The second supporting disk 8B2 includes a female screw portion 8B2a which is engaged with the male screw portion 3Bd of the piston rod 3B and sandwiches components externally fitted to the smaller diameter portion 3Bc of the piston rod 3B between the step portion 3Bb and the second supporting disk 8B2. The second supporting disk 8B2 includes the female screw portion 8B2a, the inner cylinder portion 8B2b and the outer cylinder portion 8B2c.

The first spring seat 6B1 and the second spring seat 6B2 are spring supports which support the first spring 53B and the second spring 54B and press the first leaf valve 41 and the second leaf valve 42 with the spring forces of the first spring 53B and the second spring 54B to close the first leaf valve 41 and the second leaf valve 42, respectively. The first spring seat 6B1 and the second spring seat 6B2 are substantially annular-shaped metallic plates having L-shape in cross section which includes a cylinder part for guiding the extension and contraction of the first spring 53B and the second spring 54B in the axial direction to prevent them from being buckled, and a supporting part which is formed by bending a part of the cylinder part on the side of the piston 4B to be in a flange shape.

Operation of the Hydraulic Shock Absorber 1B of the Third Embodiment

Next, the operation of the hydraulic shock absorber 1B according to the third embodiment of the present invention is described with reference to FIGS. 17A and 17B with an example in which the hydraulic shock absorber 1B is in a compressed state.

Figure 17A:
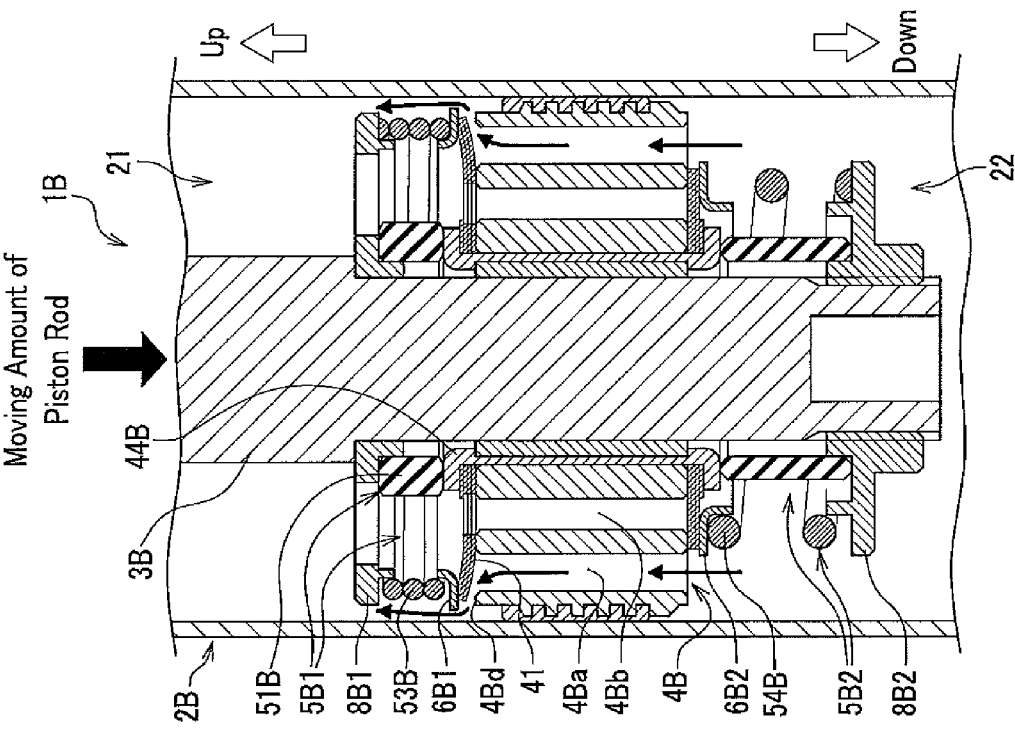
FIG. 17A is an enlarged cross sectional view of an essential part of the hydraulic shock absorber of the third embodiment showing its operation when an input load applied to the piston rod is small.
Figure 17B:
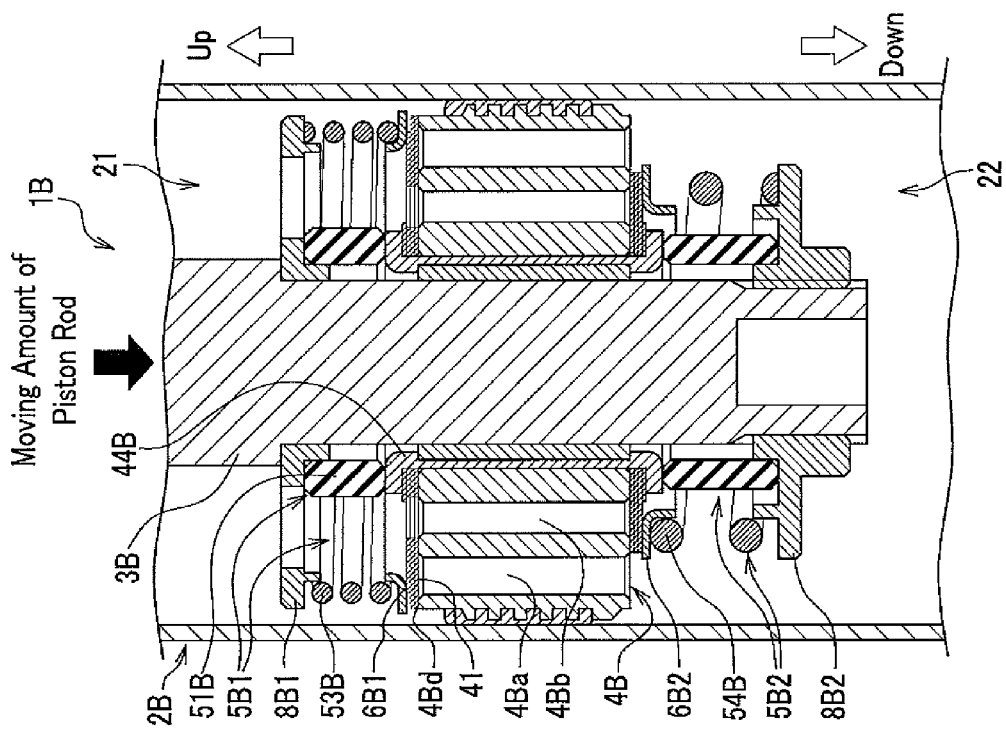
FIG. 17B is an enlarged cross sectional view of the essential part of the hydraulic shock absorber of the third embodiment showing its operation when an input load applied to the piston rod is large.

FIGS. 17A and 17B are illustrations showing the operation of the hydraulic shock absorber 1B according to the third embodiment of the present invention. FIG. 17A is an enlarged cross sectional view showing the main part of the hydraulic shock absorber 1B in a case where the movement amount of the piston rod 3B is small. FIG. 17B is an enlarged cross sectional view showing the main part of the hydraulic shock absorber 1B in a case where the movement amount of the piston rod 3B is large.

Firstly, a state of the hydraulic shock absorber 1B is described with reference to FIG. 17A in which the downward movement amount (input load) of the piston rod 3B of the hydraulic shock absorber 1B is so small that the input load does not reach the valve opening point P1 at which the first leaf valve 41 is opened. As shown in FIG. 17A, in this case, the downward sliding amount of the piston 4B is small because the movement amount of the piston rod 3B is within an amount which can be converted to the compression amounts of the first spring 53B and the first rubber 51B via the first supporting disk 8B1 and can be absorbed by the first spring 53B and the first rubber 51B. Therefore, the pressing force (reaction force) of the fluid in the second fluid chamber 22 which presses the piston 4B upward is also small.

In this case, the first leaf valve 41 is not opened because the compression amounts of the first spring 53B pressing the first leaf valve 41 and the first rubber 51B and the sliding amount of the piston 4B are all small. Thus, the damping force of the hydraulic shock absorber 1B is small. The fluid in the second fluid chamber 22 flows through the bypass passage (not shown) to the first fluid chamber 21 without flowing through the first communication passage 4Ba since the piston speed does not reach the predetermined speed S1 which corresponds to the valve opening point P1 and the first leaf valve 41 is closed. Even if the first leaf valve 41 is closed, the damping force is varied according to the piston speed since the fluid flows between the first fluid chamber 21 and the second fluid chamber 22 through the bypass passage.

In the hydraulic shock absorber 1B, the piston 4B slides with the first communication passage 4Ba being closed by the first leaf valve 41 if a pressure for opening the first leaf valve 41 which is balanced to the energizing forces of the first rubber 51B and the first spring 53B (the first energizing force and the second energizing force) is smaller than a pressure for opening the first leaf valve 41 which is balanced to the energizing force for closing the first leaf valve 41 (the second energizing force).

In the valve controlling unit 5B, if the sliding amount of the piston 4B is less than the predetermined value, the spring force (second energizing force) of the first spring 53B is larger than the elastic force (first energizing force) of the first rubber 51B, whereby the first leaf valve 41 and the first communication passage 4Ba remain closed. At this time, the compression force of the first rubber 51B is continuously increased as the piston rod 3B moving downward presses the first rubber 51B, whereby a force against the movement of the piston rod 3B is also increased continuously.

Next, a state of the hydraulic shock absorber 1B is described with reference to FIG. 17B in which the downward movement amount (input load) of the piston rod 3B of the hydraulic shock absorber 1B is large so that the input load reaches the valve opening point P2 at which the first leaf valve 41 is opened.

As shown in FIG. 17B, if the downward movement amount of the piston rod 3B is large, the large downward movement of the piston rod 3B compresses the first rubber 51B and the first spring 53B furthermore, pressing the piston 4B downward via the first rubber 51B and the first spring 53B. Thus, the pressing force (reaction force) of the fluid in the second fluid chamber 22 for pressing the piston 4B upward becomes larger.

The first rubber 51B and the first spring 53B of the valve controlling unit 5B are compressed according to the sliding amount of the piston 4B sliding in a direction opposite to the moving direction of the piston rod 3B, whereby their energizing forces are continuously varied. Thus, a step feeling at the time when a damping force characteristic is changed is reduced, which allows to enhance the ride quality of a vehicle.

The first leaf valve 41 opens the first communication passage 4Ba when a force applied to the first leaf valve 41 for opening the first leaf valve 41 becomes greater against the spring force of the first spring 53B by the pressure of the fluid flowing through the first communication passage 4Ba.

More specifically, in the first valve controlling unit 5B1, if a pressure to slide the piston 4B (second pressure) against the energizing forces (the first energizing force and the second energizing force) of the first rubber 51B and the first spring 53B is greater than a pressure (first pressure) for making the first leaf valve 41 to open the first communication passage 4Ba against the energizing force (second energizing force) of the first spring 53B, the energizing force of the first spring 53B (the second energizing force) becomes less than the energizing force of the first rubber 51B (the first energizing force) and the first leaf valve 41 opens the first communication passage 4Ba. In short, the fluid in the first communication passage 4Ba on the side of the second fluid chamber 22 presses the first leaf valve 41 upward against the first spring 53B to bend the first leaf valve 41 and flows to the first fluid chamber 21 when the piston speed reaches the valve opening point P2 of the first leaf valve 41.

In this case, a damping force is generated by the passage resistance generated by the fluid passing through the first leaf valve 41, and a total damping force of the hydraulic shock absorber 1B becomes large since the compressed amount of the first spring 53B pressing the first leaf valve 41, the compressed amount of the first rubber 51B, the sliding amount of the piston 4B and the amount of the fluid flowing through the first communication passage 4Ba are large.

Thus, in the case where the sliding amount of the piston 4B is greater than a predetermined value, if the energizing force (second energizing force) of the first spring 53B for closing the first leaf valve 41 becomes less than the energizing force (first energizing force) of the first rubber 51B, the pressure of the fluid pressing the first leaf valve 41 opens the first leaf valve 41, whereby the first communication passage 4Ba is controlled to be opened. The pressure and flow amount of the fluid at the time when the first leaf valve 41 is opened is increased continuously according to the movement amount of the piston 4B, whereby the damping force is also increased continuously.

As the fluid flows as described above, the volume of the second fluid chamber 22 is decreased, and that of the first fluid chamber 21 is increased. With this fluid flow, the piston 4B is moved downward together with the piston rod 3B relative to the cylinder 2B. The piston 4B and the piston rod 3B moves downward from the side of the first fluid chamber 21 to the side of the second fluid chamber 22 when the fluid flows to the first fluid chamber 21 through the first communication passage 4Ba.

When the piston 4B slides along the piston rod 3B, the first spring 53B and the first rubber 51B are pressed and compressed by the first supporting disk 8B1 which moves together with the piston rod 3B and the valve holding member 44B which moves together with the piston 4B. Since the valve controlling unit 5B is compressed according to the movement amount of the piston rod 3B, the spring forces (the first energizing force) of the first spring 53B and the first rubber 51B to the piston 4B are continuously increased when the first leaf valve 41 is opened. With this continuous increase of the spring force, the fluid is restrained from flowing between the second fluid chamber 22 and the first fluid chamber 21, which continuously increases the damping force against the movement of the piston rod 3B. Thus, a step feeling is reduced at the time when a damping force characteristic is changed, which allows to enhance the ride quality of a vehicle.

Next, relationships among a pressure the piston 4B receives from the fluid when the piston 4B slides, the elastic force of the first rubber 51B of the valve controlling unit 5B, the spring force of the first spring 53B and a pressure the first leaf valve 41 receives from the fluid when the piston 4B slides are explained.

The elastic force (first energizing force) of the first rubber 51B is proportional to the product of the pressure difference between the first fluid chamber 21 and the second fluid chamber 22 and the pressure receiving area of the piston 4B which receives the fluid pressure.

The spring force (second energizing force) of the first spring 53B is proportional to the product of the pressure difference between the first fluid chamber 21 and the second fluid chamber 22 and the pressure receiving area of the first leaf valve 41 which receives the fluid pressure.

Figure 18:
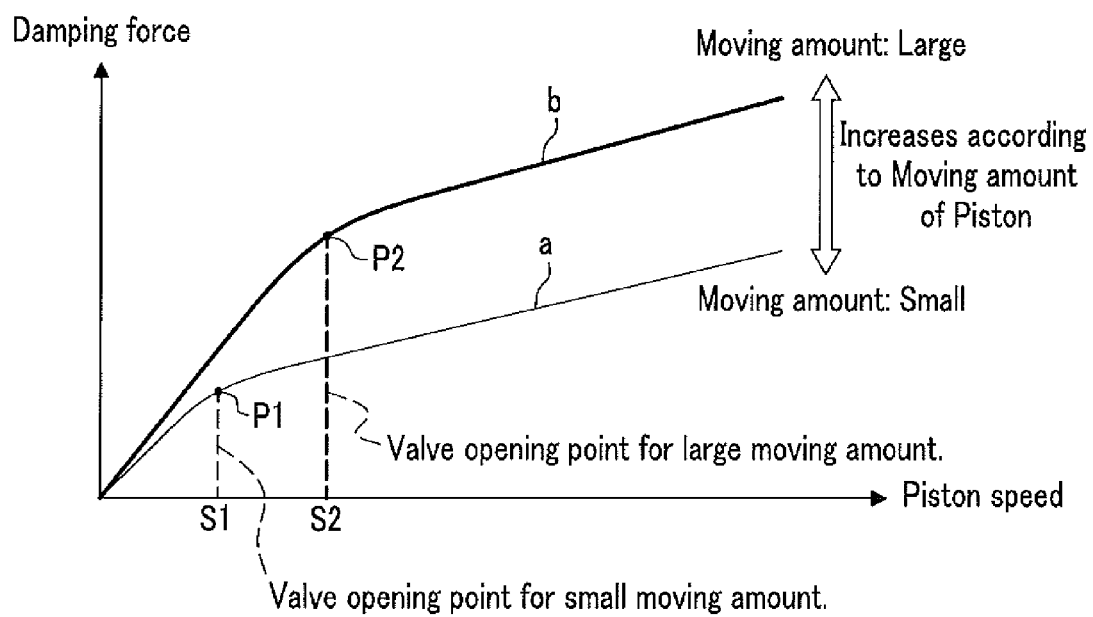
FIG. 18 is a graph showing the relationship of the piston speed of the sliding piston in the hydraulic shock absorber of the third embodiment and the damping force of the hydraulic shock absorber.
Figure 20:
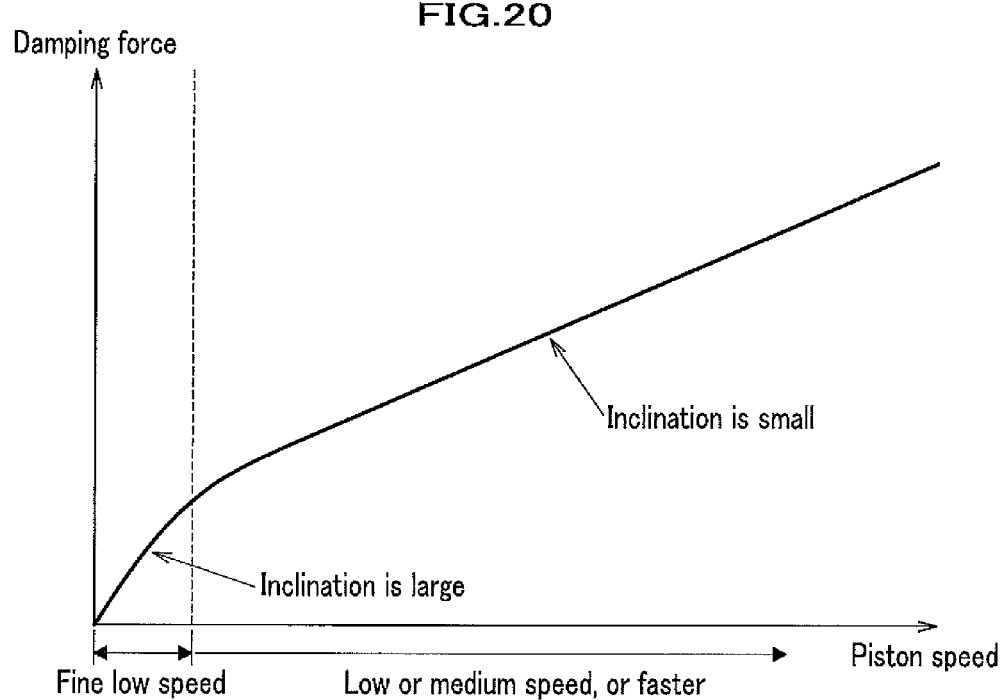
FIG. 20 is a graph showing a relationship of the damping force of a conventional hydraulic shock absorber and a piston speed.
Figure 21A:
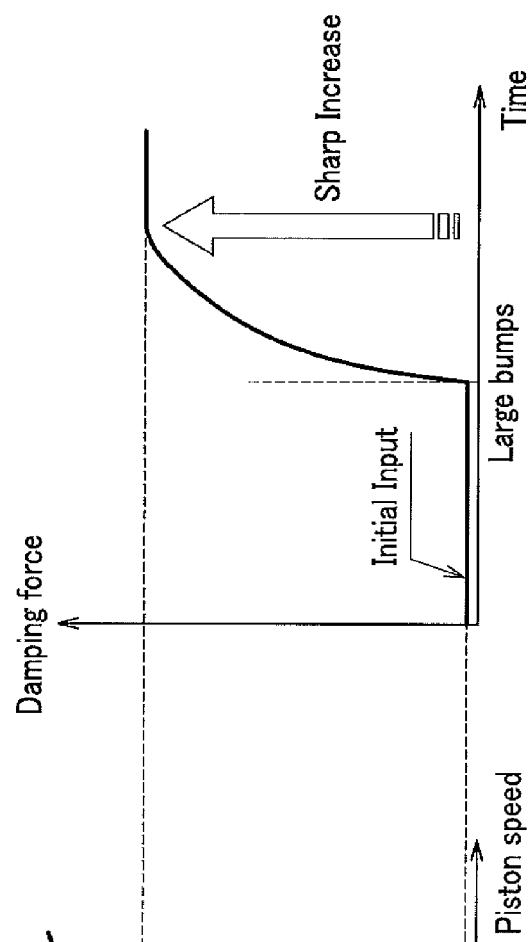
FIG. 21A is a graph of a damping force characteristic of the hydraulic shock absorber disclosed in Japanese Patent Application Publication No. 9-291961 showing the relationship of a piston speed and the damping force.
Figure 21B:
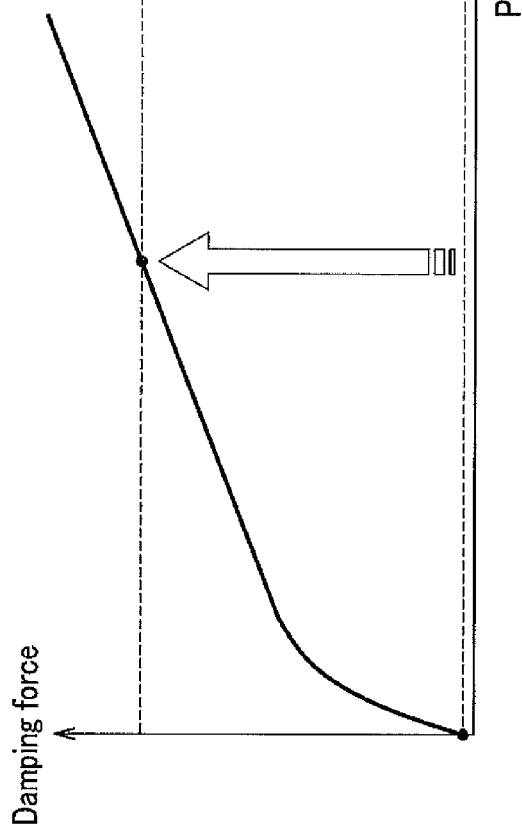
FIG. 21B is a graph of a damping force characteristic of the hydraulic shock absorber disclosed in Japanese Patent Application Publication No. 9-291961 showing the relationship of time and the damping force.

Next, the relationship between the piston speed of the piston 4B and the damping force generated in the hydraulic shock absorber 1B is described. FIG. 18 is a graph showing the relationship between the piston speed of the piston in the hydraulic shock absorber according to the third embodiment of the present invention and the damping force.

<If the Movement Amount of the Piston Rod 3B is Small>

In FIG. 18, the valve opening points P1, P2 indicate points at which the first leaf valve 41 is fully opened. As indicated by a thin curve a shown in FIG. 18, if the movement amount of the piston rod 3B (input load) is small, the damping force characteristic depends on the pressing force applied to the first leaf valve 41 until the piston speed reaches the valve opening point P1 at which the first leaf valve 41 becomes fully opened.

Thus, when the movement amount of the piston rod 3B is small, a damping force generated in the hydraulic shock absorber 1B increases substantially in proportion to the piston speed of the piston 4B. If the piston speed of the piston 4B is a slow speed which is less than a predetermined speed S1 and does not reach the valve opening point P1 of the first leaf valve 41, the first leaf valve 41 is closed, and the fluid in the second fluid chamber 22 flows to the first fluid chamber 21 through the bypass passage (not shown). Thus, even if the first leaf valve 41 is closed, the damping force is varied according to the piston speed because the fluid flows between the first fluid chamber 21 and the second fluid chamber 22.

If the piston speed of the piston 4B increases to the predetermined speed S1, the movement of the piston rod 3B according to the piston speed is transmitted to the piston 4B via the valve controlling unit 5B. Thus, the reaction force of the fluid in the second fluid chamber 22 is increased as the piston speed increases, and the fluid flows into the first communication passage 4Ba in high speed, pressing the first leaf valve 41. The flow amount and the pressure of the fluid flowing through the first communication passage 4Ba is increased according to the piston speed even if the movement amount of the piston 4B is small. Thus, the pressing force of the fluid becomes larger than the energizing force for closing the first leaf valve 41 and opens the first leaf valve 41.

In other words, even if the movement amount of the piston 4B is small, a pressure for opening the first leaf valve 41 which is balanced to the energizing force (second energizing force) for closing the first leaf valve 41 becomes greater than a pressure for opening the first leaf valve 41 which is balanced to the energizing forces (the first energizing force and the second energizing force) of the first rubber 51B and the first spring 53B when the piston speed is high, whereby the first leaf valve 41 is opened. When the first leaf valve 41 is opened, the fluid in the second fluid chamber 22 flows to the first fluid chamber 21.

The part of the curve a in the above-described case is a gently bent damping force characteristic curve because the first rubber 51B and the first spring 53B are provided on the valve closing side of the leaf valve 41 so that damping force is continuously changed, whereby a stepped feeling can be reduced.

If the piston speed exceeds the predetermined speed S1 corresponding to the valve opening point P1 at which the first leaf valve 41 is opened, the first leaf valve 41 becomes fully opened, and the damping force generated in the hydraulic shock absorber 1B is increased substantially in proportion to the piston speed as a resistance to the fluid flowing through the first communication passage 4Ba is increased by the orifice effect.

<In a Case where the Movement Amount of the Piston Rod is Large>

As shown in the thick curve b shown in FIG. 18, if the movement amount of the piston rod 3B (input load) is greater than that of the curve a, in the damping force characteristic before the valve opening point P2 at which the first leaf valve 41 becomes fully opened, the damping force generated in the hydraulic shock absorber 1B is greater than that of the curve a over entire piston speed range since the first rubber 51B and the first spring 53B are highly compressed according to the movement amount of the piston rod 3B, compared to the case in which the movement amount of the piston rod 3B is small, so that the pressing force applied to the first leaf valve 41 and the sliding amount of the piston 4B become larger.

If the movement amount of the piston rod 3B is large, until the piston speed reaches the predetermined speed S2 which corresponds to the valve opening point P2, the damping force generated in the hydraulic shock absorber 1B increases substantially in proportion to the piston speed of the piston 4B as shown by the curve b, and is larger than that of the curve a in which the movement amount is small by the difference in the movement amounts. If the piston speed of the piston 4B is increased to the predetermined speed S2 which corresponds to the valve opening point P2, the movement of the piston rod 3B is transmitted to the piston 4B via the valve controlling unit 5B in a high speed. Thus, the fluid in the second fluid chamber 22 flows to the first communication passage 4Ba in a high speed to press the first leaf valve 41, opening the first leaf valve 41 with increased flow amount and fluid pressure. The fluid then flows to the first fluid chamber 21.

When the first leaf valve 41 is switched from the closing state to the opening state at the valve opening point P2, the first rubber 51B and the first spring 53B of the valve controlling unit 5B are subsequently compressed continuously, similarly to the time of the valve opening point P1, and absorbs the pressing force (reaction force) of the fluid in the second fluid chamber 22. Thus, the damping force generated in the hydraulic shock absorber 1B is not sharply increased. Further, since the damping force can be continuously varied even at the valve opening point P2, the step feeling at the time when the damping force characteristic is changed can be reduced.

If the piston speed exceeds the predetermined speed S2 which corresponds to the valve opening point P2 at which the first leaf valve 41 can be opened, the first leaf valve 41 becomes fully opened, and the damping force generated in the hydraulic shock absorber 1B gently increases substantially in proportion to the piston speed as the resistance to the fluid flowing through the first communication passage 4Ba is increased due to the orifice effect.

In this case, the first rubber 51B and the first spring 53B are highly compressed and the pressing force applied to the first leaf valve 41 become larger, compared to the case of the curve a. Thus, the damping force indicated by the curve b is greater than that of the curve an over entire piston speed range by the increased amount of the pressing force applied to the first leaf valve 41. This enhances the steering performance and ride quality of the vehicle. Similarly to the curve a, if the piston speed exceeds the predetermined speed S2 which corresponds to the valve opening points P2, the inclination of the curve b of the damping force characteristic becomes constant regardless of the movement amount of the piston rod 3B. It is to be noted that the variable-width of the damping force may be controlled by changing the spring rate of the first rubber 51B.

The operation of the hydraulic shock absorber 1B is described with an example in which the hydraulic shock absorber 1B is in a compressed. By replacing the first valve controlling unit 5B1 with the second valve controlling unit 5B2, the hydraulic shock absorber 1B in an extended state operates in the same way as in a compressed state, and thus description thereof is omitted.

The Modification of the Third Embodiment

FIGS. 19A and 19B are illustrations showing the operations of a modification of the hydraulic shock absorber according to the third embodiment of the present invention. FIG. 19A is an enlarged cross sectional view showing a main part of the hydraulic shock absorber when the piston rod is in a rest state (closed state). FIG. 19B is an enlarged cross sectional view showing a main part of the hydraulic shock absorber when the piston rod is in a sliding state (opened state).

As shown in FIGS. 19A and 19B, the hydraulic shock absorber 1B of the third embodiment may include on the outer circumferential surface 3Be of the piston rod 3B which is located inner side of the piston 4B the grooves 3Ba (second communication passage) which are opened when the piston 4B moves to the side of the second fluid chamber 21.

With this configuration, the damping force characteristic can be changed according to the movement amount of the piston 4B because the grooves 3Ba function as valve controlling unit 5 for controlling the opening and closing of the second communication passage between the first fluid chamber 21 and the second fluid chamber 22 according to the movement amount of the piston 4B (the amplitude amount of the piston rod).

It is to be noted that the first rubber 51B and the second rubber 51B may be springs such as a cylindrical coil spring. The shape and the material of the first leaf valve 41 and the second leaf valve 42 are not limited to those described in the specification. The first leaf valve 41 and the second leaf valve 42 may be formed of any material or formed to be in any shape as long as they have an appropriate elastic force for pressing the first communication passages 4Ba and the third communication passages 4Bb with an appropriate pressing force.

What is claimed is:
1. A hydraulic shock absorber which comprises:
a primary piston which is slidably fitted into a cylinder and partitions the cylinder into first and second fluid chambers; and
a piston rod which is connected to the primary piston and slidably penetrates through an end wall of the cylinder, the piston rod comprising an enlarged-diameter portion which extends through the end wall of the cylinder, and a reduced-diameter portion integrally attached to the enlarged-diameter portion; wherein:
a step portion of the piston rod is defined between the enlarged-diameter portion and the reduced-diameter portion;
the piston rod penetrates through the primary piston, and includes on the outer circumferential surface of the piston rod at least one groove which selectively communicates between the first and second fluid chambers, the groove extending in an axial direction along the piston rod from an area of the enlarged-diameter portion proximate the step portion to an area of the reduced-diameter portion; and
the first and second fluid chambers are communicated with each other through the at least one groove.

2. The hydraulic shock absorber of claim 1, further comprising an opening controlling unit for controlling an area of an opening of the at least one groove which faces to the first or second fluid chamber according to a sliding state of the piston rod relative to the cylinder, wherein the opening controlling unit is configured and arranged such that in a resting position thereof, fluid flow through the at least one groove is obstructed.

3. The hydraulic shock absorber of claim 2, wherein the opening controlling unit comprises:
a moving unit which moves in an axial direction of the piston rod to control the area of the opening; and
at least one energizing spring unit which is supported by the piston rod and energizes the moving unit in the axial direction, and wherein the moving unit moves against an energizing spring force of the energizing spring unit according to the sliding state of the piston rod to control the area of the opening.

4. The hydraulic shock absorber according to claim 3, further comprising a cover which is arranged on the outer circumferential surface of the piston rod at a position adjacent to the primary piston, wherein the cover includes a through-hole right above the at least one groove, and the moving unit moves over the through-hole.

5. The hydraulic shock absorber according to claim 4, wherein the step portion is provided on the outer circumferential surface of the piston rod at a position displaced from both ends of the at least one groove in an axial inner direction, and the primary piston is arranged to be displaced from the both ends of the groove by the step portion.

6. The hydraulic shock absorber according to claim 2, wherein the step portion is provided on the outer circumferential surface of the piston rod at a position displaced from both ends of the at least one groove in an axial inner direction, and the primary piston is arranged to be displaced from the both ends of the groove by the step portion.

7. The hydraulic shock absorber according to claim 3, wherein the step portion is provided on the outer circumferential surface of the piston rod at a position displaced from both ends of the at least one groove in an axial inner direction, and the primary piston is arranged to be displaced from the both ends of the groove by the step portion.

8. The hydraulic shock absorber according to claim 1, wherein the step portion is provided on the outer circumferential surface of the piston rod at a position displaced from both ends of the at least one groove in an axial inner direction, and the primary piston is arranged to be displaced from the both ends of the groove by the step portion.

9. The hydraulic shock absorber according to claim 1, wherein the primary piston is provided to be movable relative to the piston rod in the cylinder and the primary piston comprises a first communication passage which communicates between the first and the second fluid chambers, and wherein
the hydraulic shock absorber further includes a valve for opening or closing the first communication passage and a piston movement amount controlling unit for controlling a movement amount of the primary piston according to a moving speed of the piston rod.

10. The hydraulic shock absorber according to claim 9, wherein:
the at least one groove is arranged at a position radially inner side of the primary piston as a second communication passage which communicates between the first and second fluid chambers, and
the piston movement amount controlling unit controls a communication state of the second communication passage between the first and second fluid chambers according to the sliding state of the primary piston.

11. The hydraulic shock absorber according to claim 10, wherein the piston movement amount controlling unit is supported by the piston or the piston rod and includes an energizing unit for energizing the primary piston in the axial direction, and wherein
the primary piston slides against an energizing force of the energizing unit according to the moving speed of the piston rod to control an area of an opening of the second communication passage which faces to the first or second fluid chamber.

12. The hydraulic shock absorber according to claim 9, further comprising a sliding part which sandwiches the primary piston and the valve in an axial direction of the piston rod, holds the primary piston and the valve from a radial inner side of the sliding part and slides along the outer circumferential surface of the piston rod to open or close the second communication passage.

13. The hydraulic shock absorber according to claim 9, further comprising a valve controlling unit for controlling an opening and closing state of the valve according to the movement amount of the primary piston.

14. The hydraulic shock absorber according to claim 13, wherein the valve controlling unit comprises:
a first elastic unit which presses the primary piston in a direction opposite to a sliding direction of the primary piston with a first energizing force which is continuously varied according to an amount of the slide of the primary piston in an opposite direction of a sliding direction of the piston rod,
a second elastic unit which presses the valve with a second energizing force which is continuously varied according to the sliding amount of the primary piston in the same direction as that of the first energizing force, and wherein
the valve opens the first communication passage if a force applied to the valve by a pressure of the fluid passing through the first communication passage becomes larger against the second energizing force.

15. The hydraulic shock absorber according to claim 14, wherein the valve controlling unit
makes the valve close the first communication passage during the sliding of the primary piston if a second pressure is smaller than a first pressure and
makes the valve open the first communication passage if the second pressure is larger than the first pressure, wherein
the first pressure is a pressure for making the valve open the first communication passage against the second energizing force and
the second pressure is a pressure for making the primary piston slide against the first energizing force and the second energizing force.

16. The hydraulic shock absorber according to claim 13, further comprising a sliding part which is fitted into the primary piston and the valve from the radial inner side of the primary piston, sandwiches the primary piston and the valve in the axial direction wherein the sliding part slides along the piston rod with the inner circumferential surface of the sliding part being in contact with the piston rod.

17. The hydraulic shock absorber of claim 1, further comprising a free piston which is slidably disposed in the cylinder and which separates the second fluid chamber from a pressurized gas chamber in the cylinder, the free piston having a sealing member extending therearaound.

* * * * *